(12) United States Patent
Jung et al.

(10) Patent No.: US 12,326,579 B2
(45) Date of Patent: Jun. 10, 2025

(54) LENS CURVATURE VARIATION APPARATUS

(71) Applicants: LG INNOTEK CO., LTD., Seoul (KR); CORNING INCORPORATED, Corning, NY (US)

(72) Inventors: Sung Ki Jung, Seoul (KR); Young Seop Moon, Seoul (KR)

(73) Assignees: LG INNOTEK CO., LTD., Seoul (KR); CORNING INCORPORATED, Corning, NY (US)

( * ) Notice: Subject to any disclaimer, the term of this patent is extended or adjusted under 35 U.S.C. 154(b) by 110 days.

(21) Appl. No.: 17/625,912

(22) PCT Filed: Jul. 9, 2020

(86) PCT No.: PCT/KR2020/009045
§ 371 (c)(1),
(2) Date: Jan. 10, 2022

(87) PCT Pub. No.: WO2021/006675
PCT Pub. Date: Jan. 14, 2021

(65) Prior Publication Data
US 2022/0268972 A1    Aug. 25, 2022

(30) Foreign Application Priority Data
Jul. 9, 2019  (KR) .................. 10-2019-0082858

(51) Int. Cl.
*G02B 3/14*        (2006.01)
*G02B 26/00*       (2006.01)

(52) U.S. Cl.
CPC ............. *G02B 3/14* (2013.01); *G02B 26/004* (2013.01)

(58) Field of Classification Search
CPC .................................. G02B 3/14; G02B 3/12
See application file for complete search history.

(56) References Cited

U.S. PATENT DOCUMENTS

| | | |
|---|---|---|
| 7,897,899 B2 | 3/2011 | Uchino et al. |
| 10,241,240 B1 | 3/2019 | Choi |
| (Continued) | | |

FOREIGN PATENT DOCUMENTS

| | | |
|---|---|---|
| CN | 109906390 A | 6/2019 |
| JP | 2009-47801 A | 3/2009 |
| (Continued) | | |

OTHER PUBLICATIONS

International Search Report, issued in PCT/KR2020/009045, dated Oct. 30, 2020.

*Primary Examiner* — Marin Pichler
*Assistant Examiner* — Justin W. Hustoft
(74) *Attorney, Agent, or Firm* — Birch, Stewart, Kolasch & Birch, LLP

(57) ABSTRACT

A lens curvature variation apparatus according to an embodiment includes: a liquid lens including a first electrode and a second electrode, and containing a first liquid and a second liquid forming an interface with each other; a voltage booster including a first switching element, and converting an input voltage into a voltage of a first level higher than the input voltage by a switching operation of the first switching element; a lens driver applying a driving voltage for adjusting the interface to the first electrode and the second electrode by using the voltage of the first level; a sensor unit sensing the interface controlled by the driving voltage; and a control unit controlling the lens driver so that the liquid lens forms a target interface based on information of the interface sensed by the sensor unit, wherein the voltage booster is deactivated during a sensing time at which the interface of the liquid lens is sensed by the sensor unit.

12 Claims, 28 Drawing Sheets

(56) References Cited

U.S. PATENT DOCUMENTS

| | | | |
|---|---|---|---|
| 2018/0164576 A1* | 6/2018 | Tseng | G02B 3/14 |
| 2019/0129076 A1* | 5/2019 | Choi | G02B 7/021 |
| 2020/0319380 A1 | 10/2020 | Kaminski et al. | |
| 2020/0386983 A1 | 12/2020 | Song et al. | |
| 2021/0109257 A1 | 4/2021 | Moon | |

FOREIGN PATENT DOCUMENTS

| | | | |
|---|---|---|---|
| KR | 10-2013-0032459 A | 4/2013 | |
| KR | 10-2017-0025741 A | 3/2017 | |
| KR | 10-2018-0107929 A | 10/2018 | |
| KR | 10-1972052 B1 | 4/2019 | |
| KR | 10-2019-0068277 A | 6/2019 | |
| WO | WO 2019/099648 A1 | 5/2019 | |
| WO | WO-2019112132 A1 * | 6/2019 | G02B 26/004 |

\* cited by examiner

[FIG. 1]
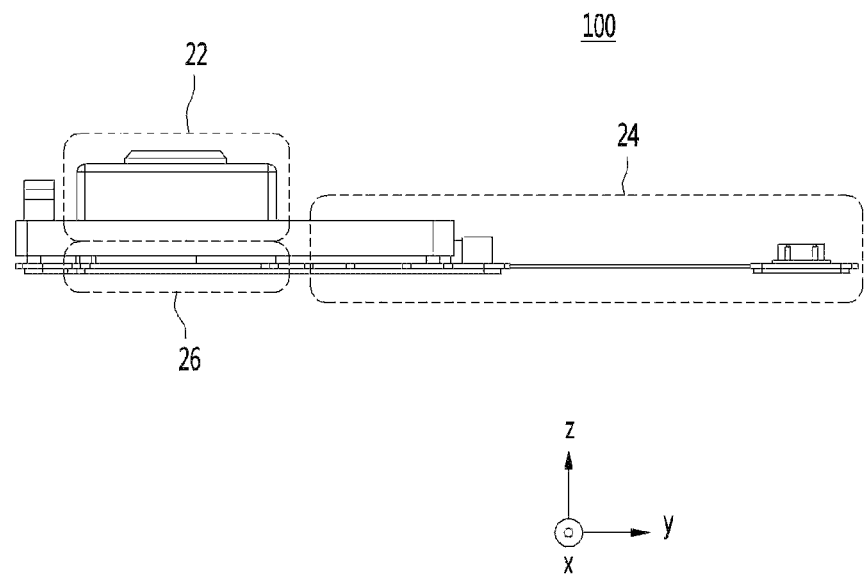
[FIG. 2]
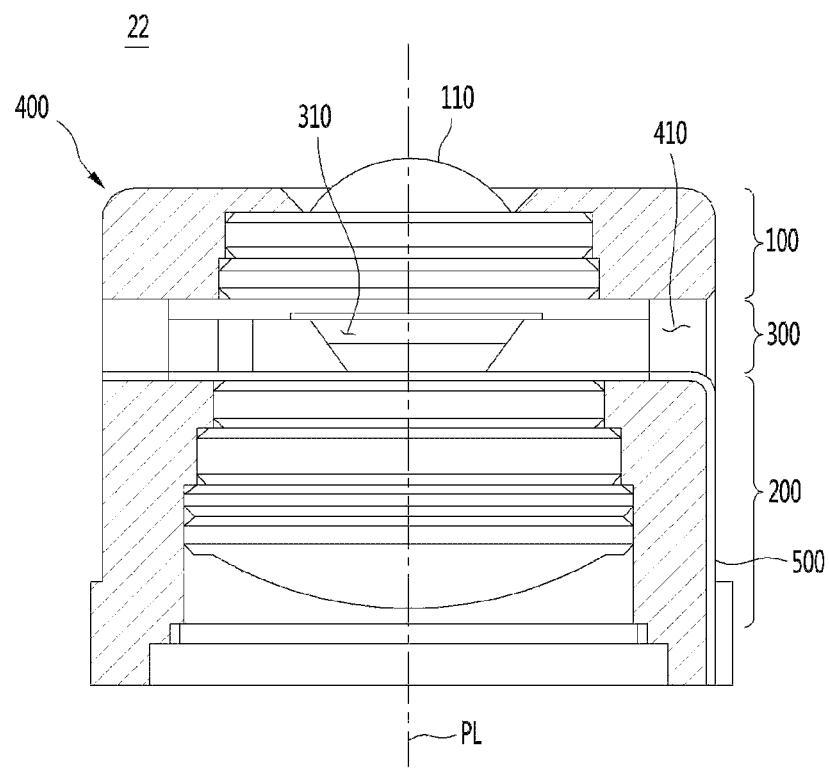

[FIG. 3a]
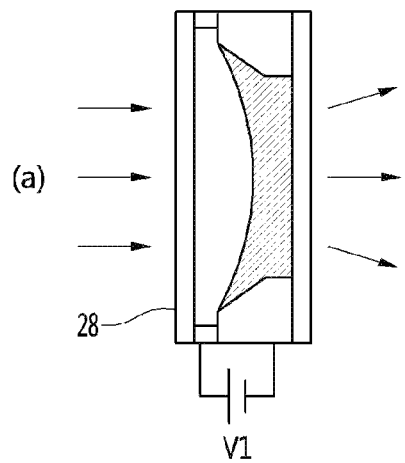
(a)
V1
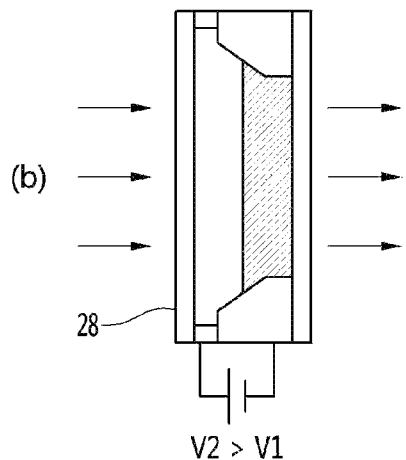
(b)
V2 > V1
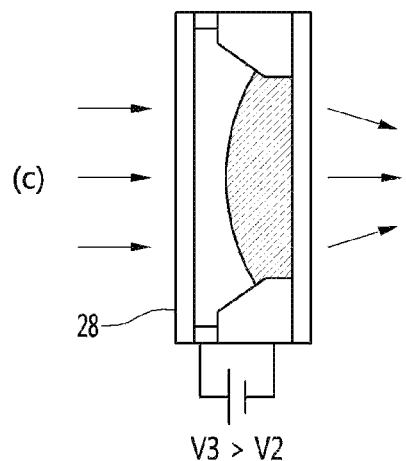
(c)
V3 > V2

[FIG. 3b]
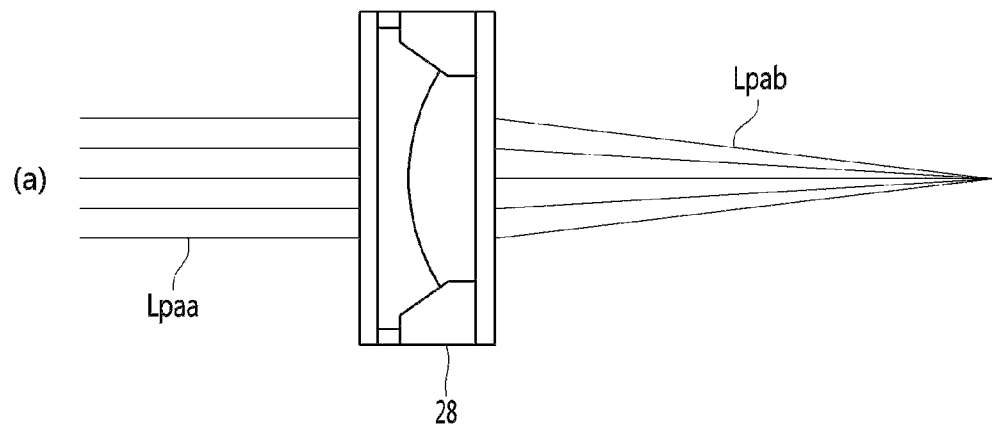
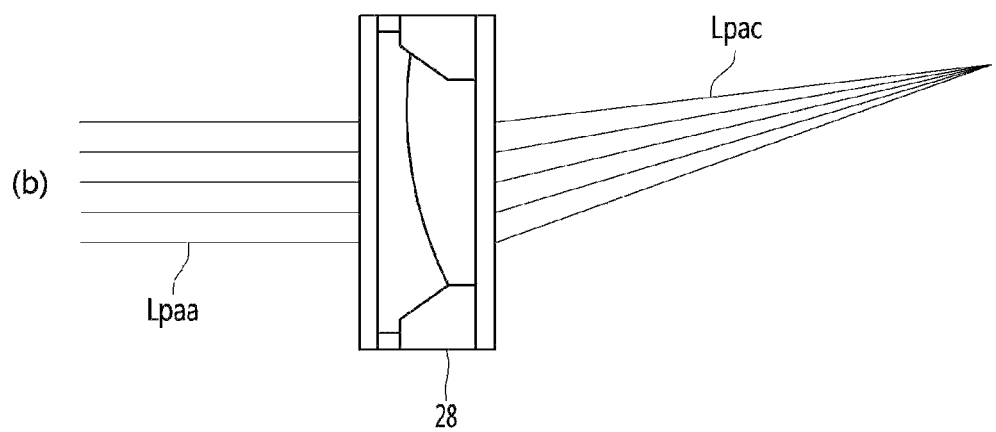

[FIG. 4]
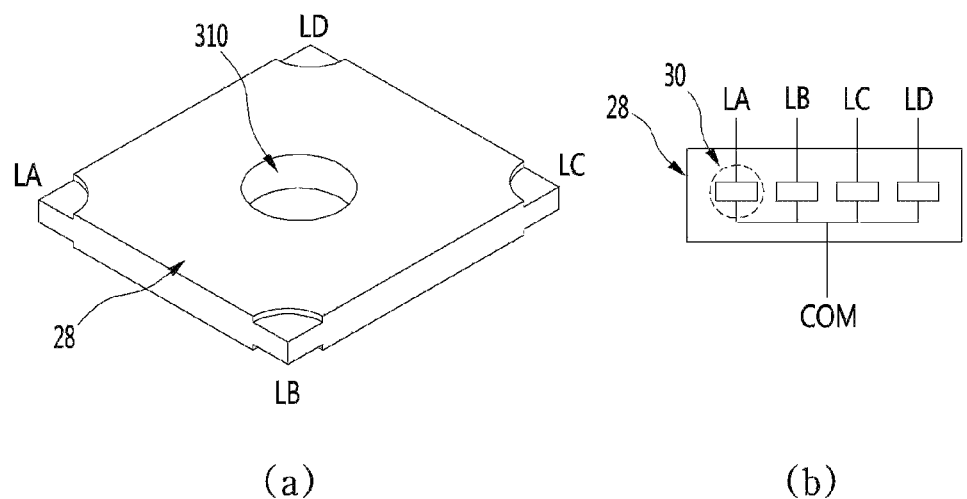
(a)          (b)
[FIG. 5a]
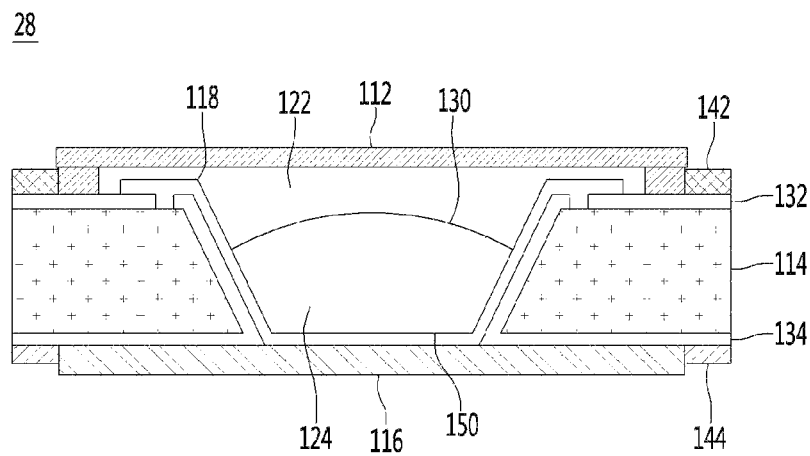

[FIG. 5b]
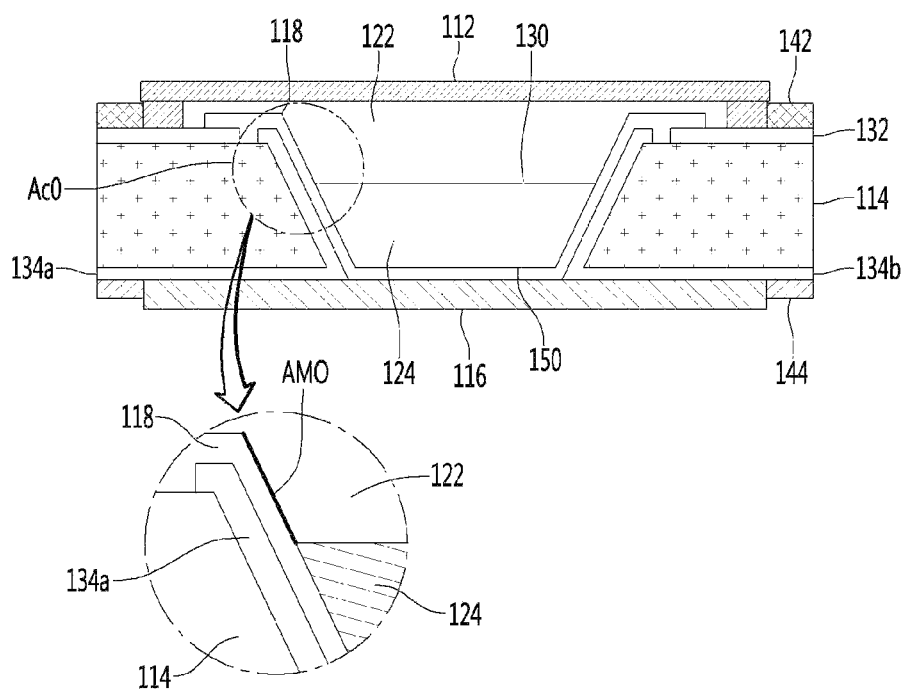

[FIG. 6a]
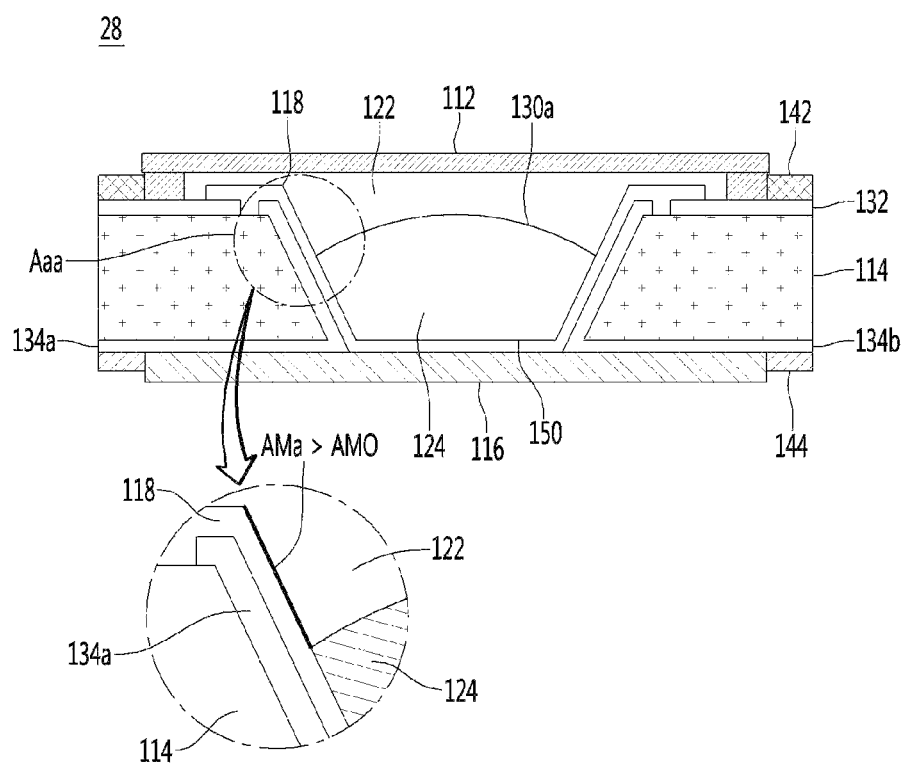

[FIG. 6b]
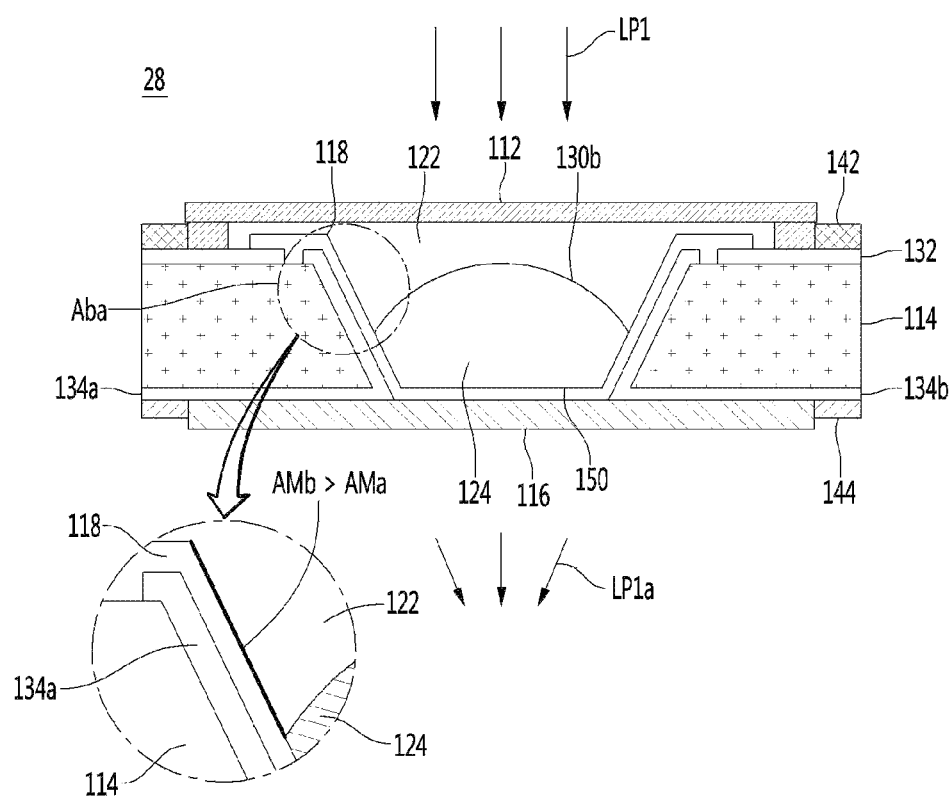

[FIG. 6c]
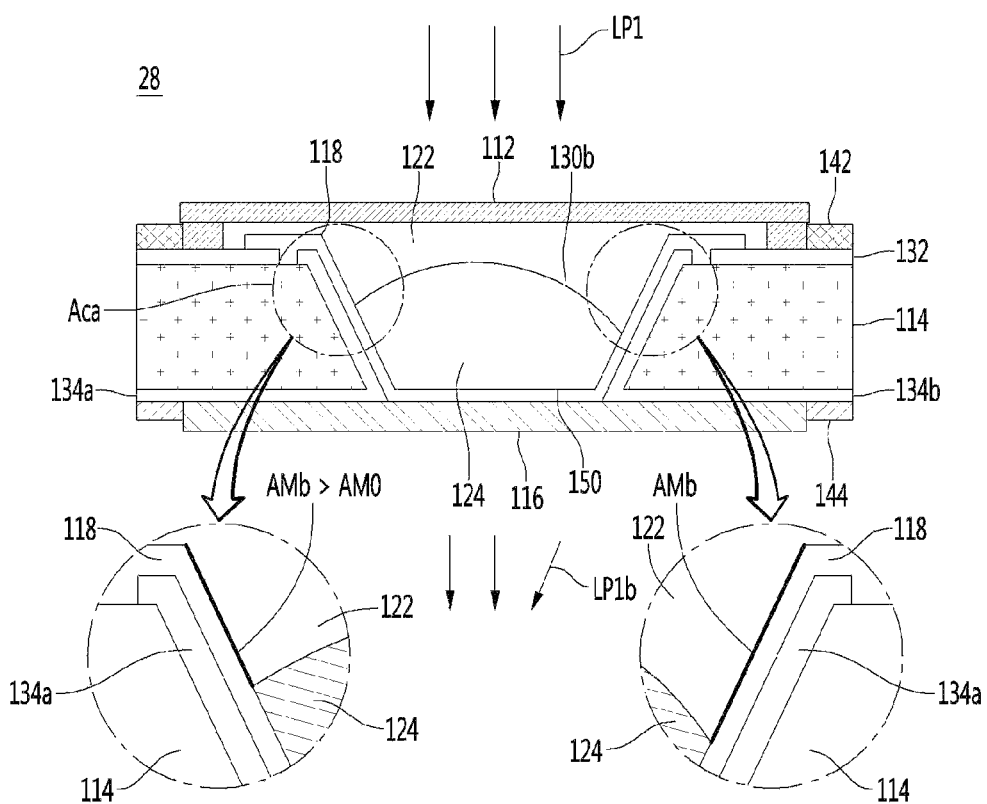

【FIG. 6d】
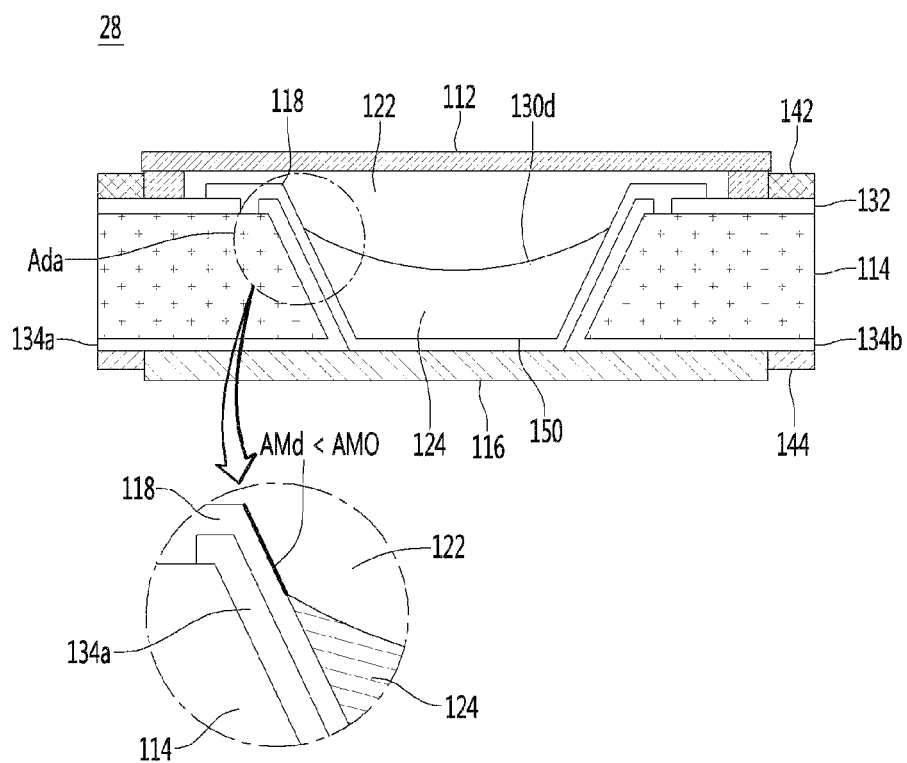

[FIG. 6e]
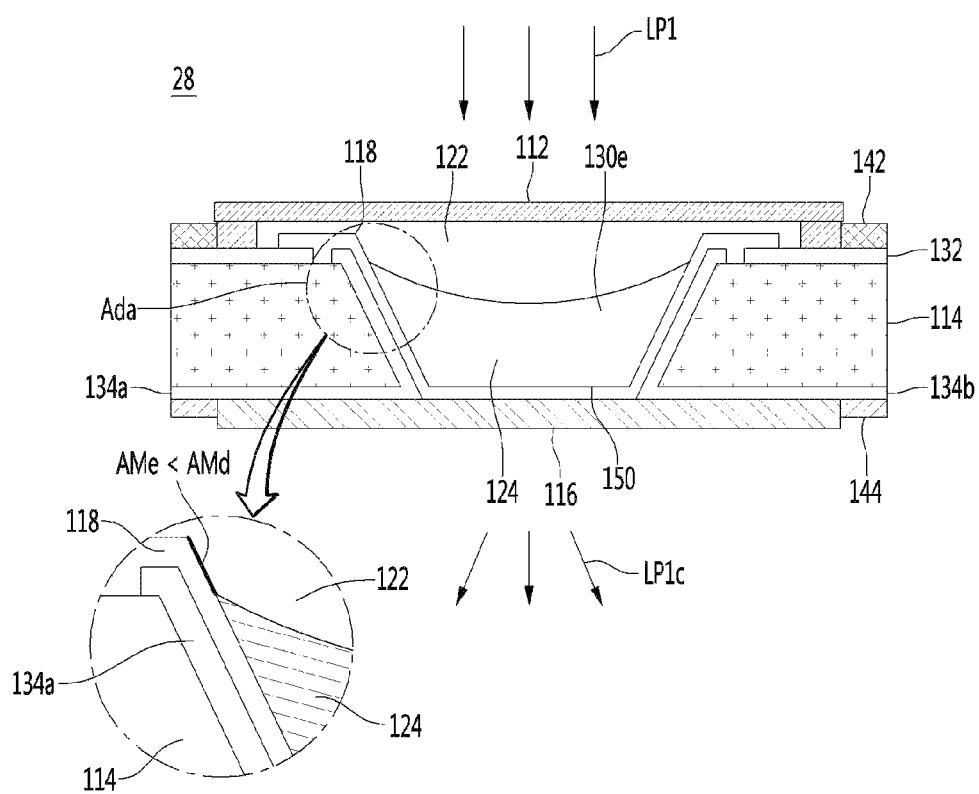

[FIG. 7]
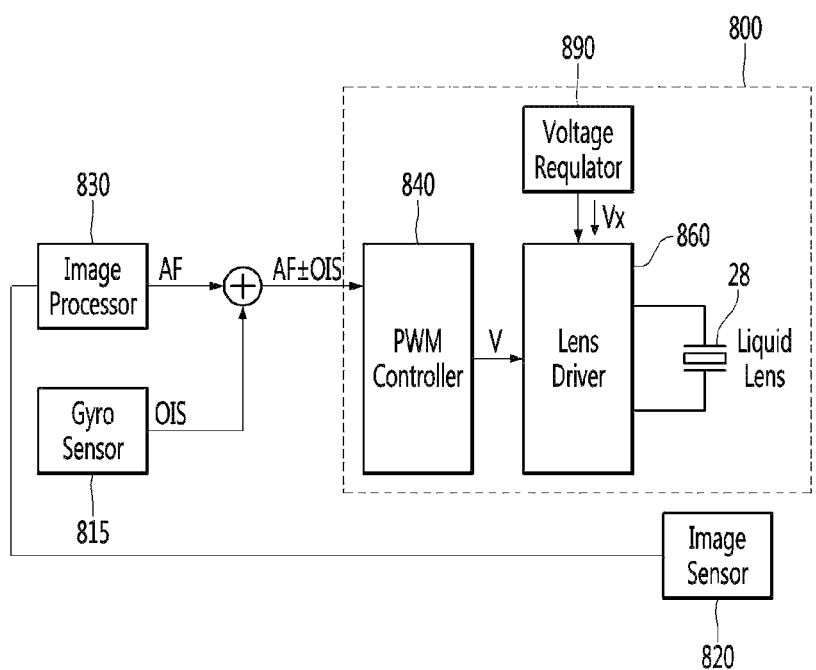

[FIG. 8]
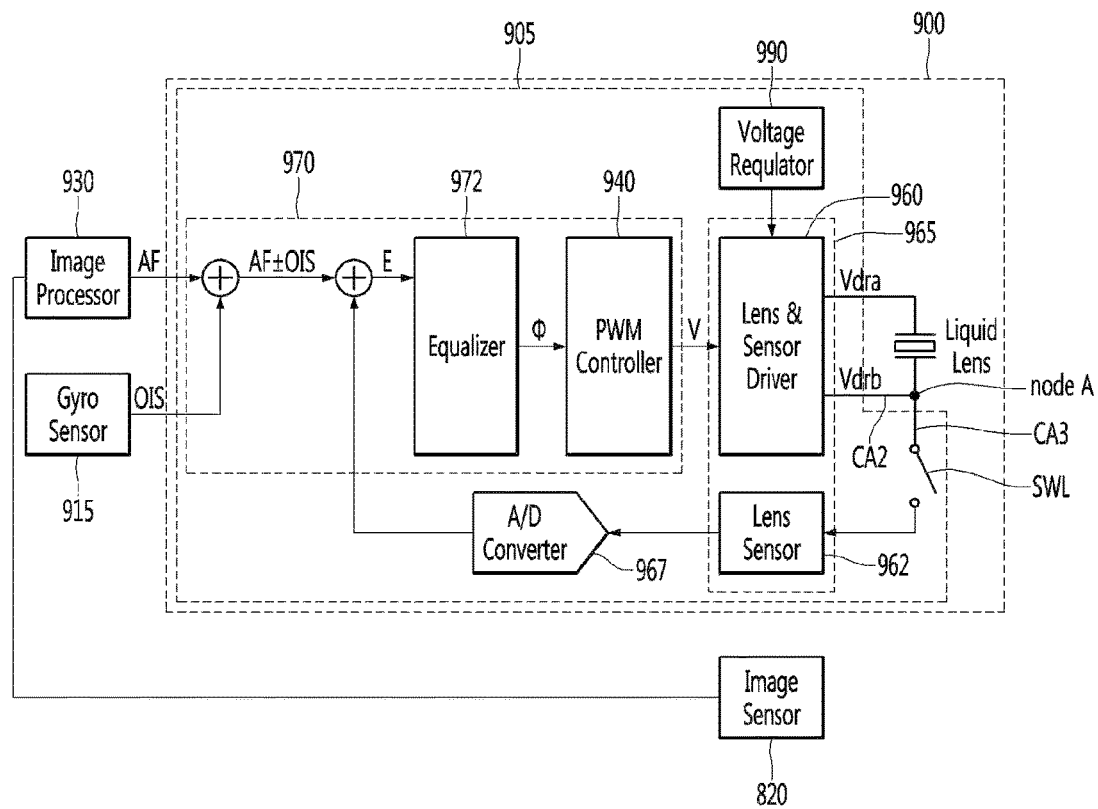
[FIG. 9]
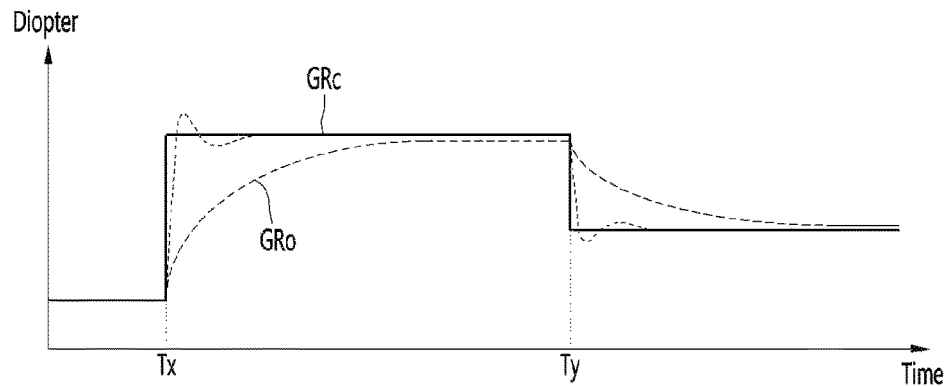

【FIG. 10】
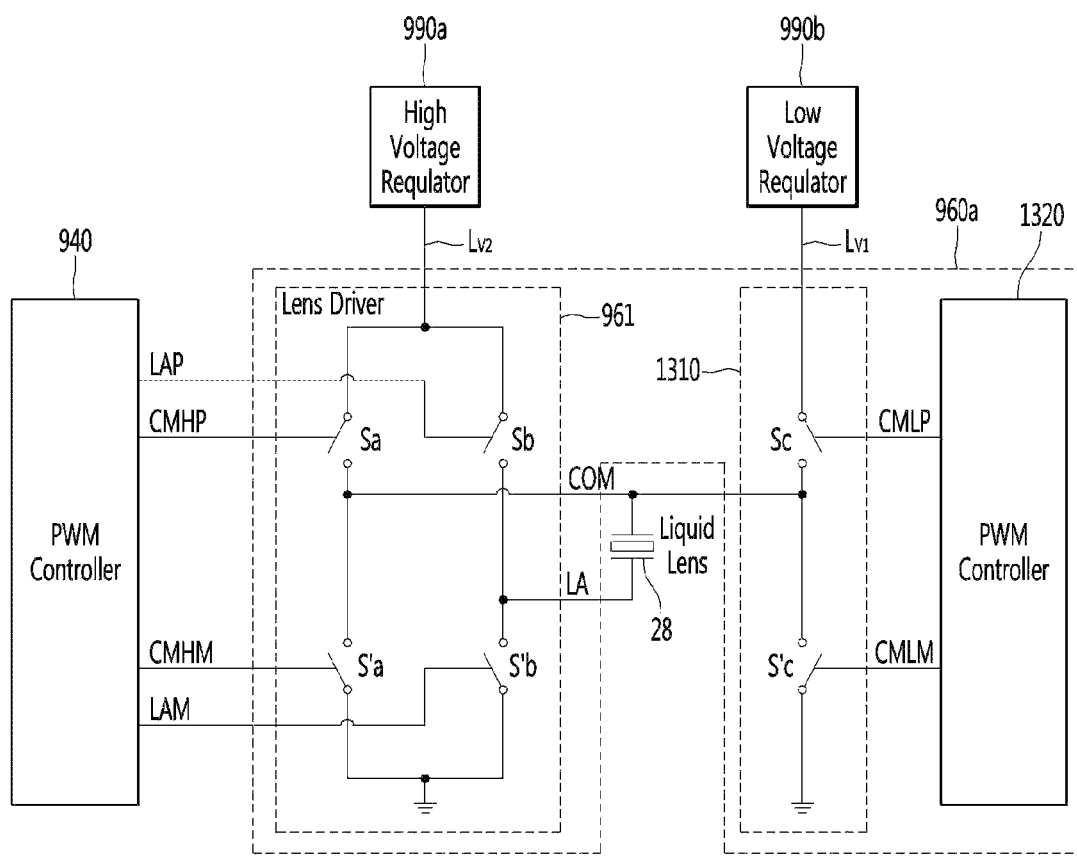

[FIG. 11]
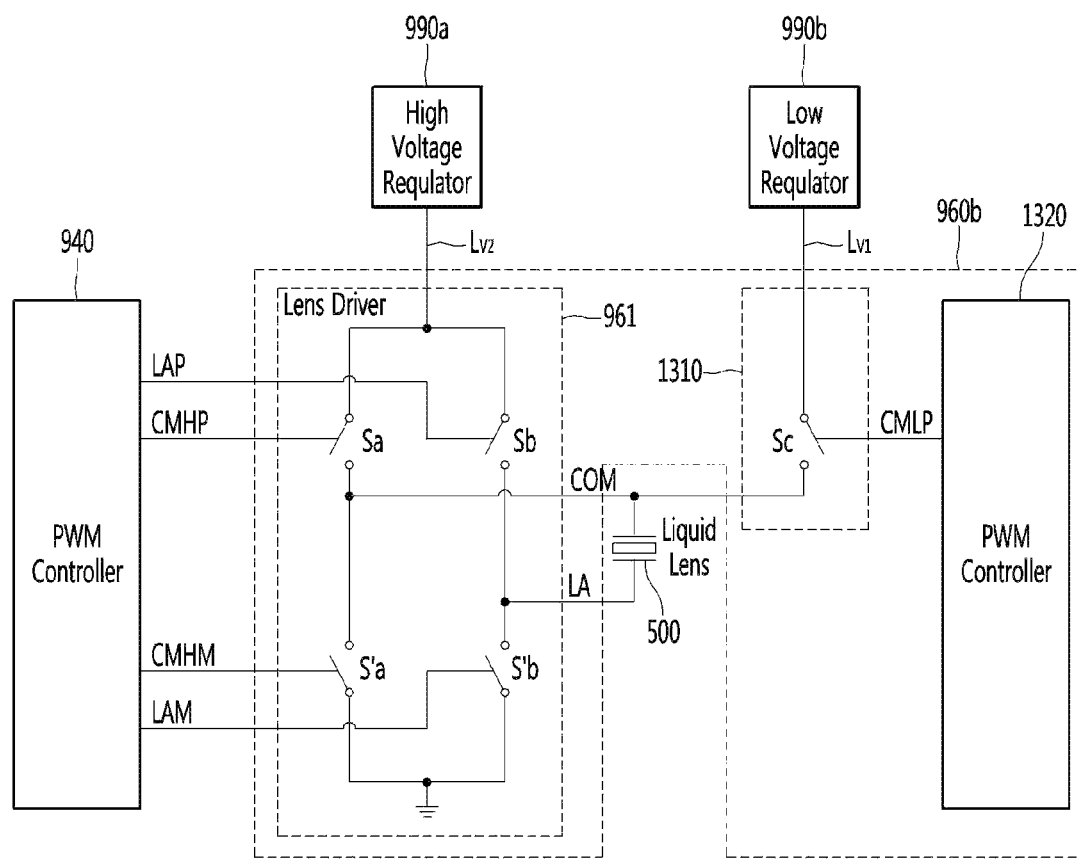

[FIG. 12]
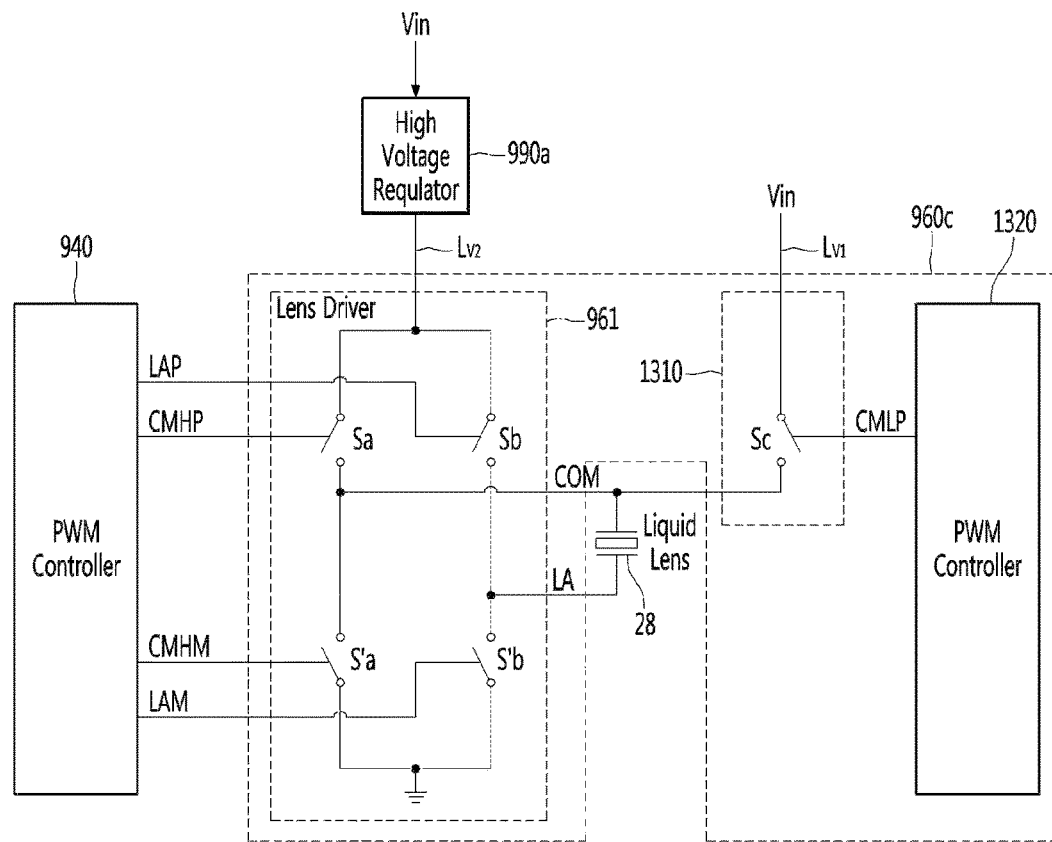
[FIG. 13a]
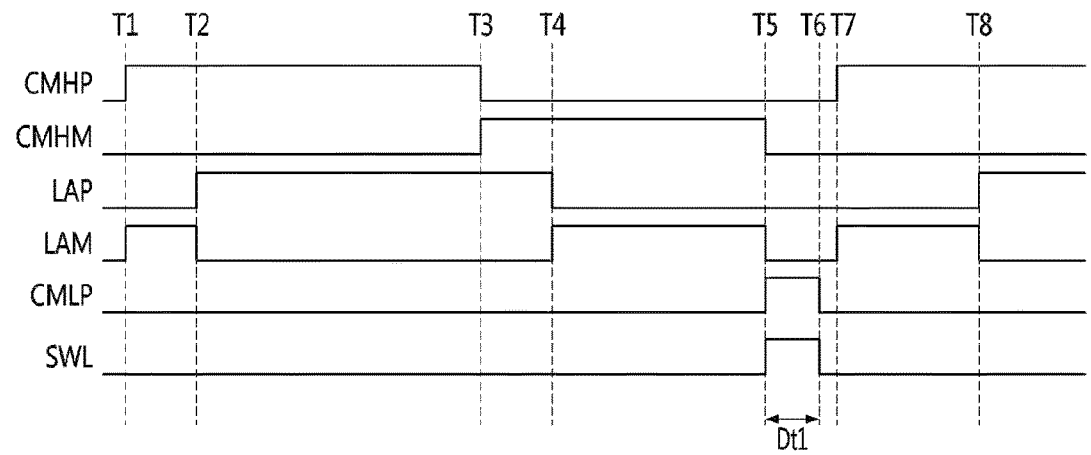

[FIG. 13b]
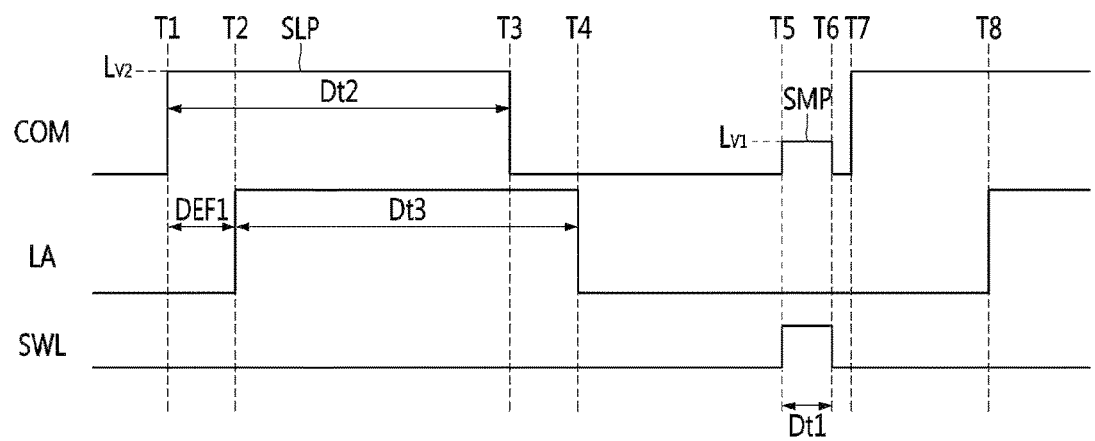
[FIG. 14]
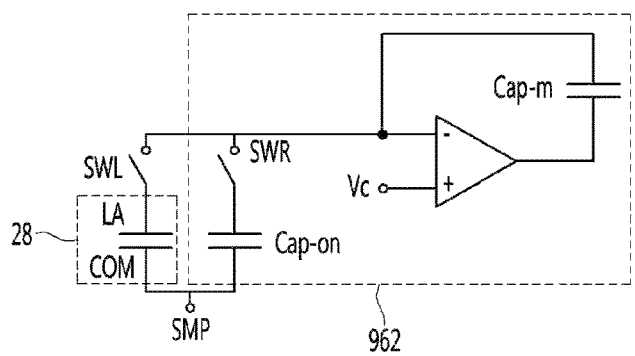

【FIG. 15】
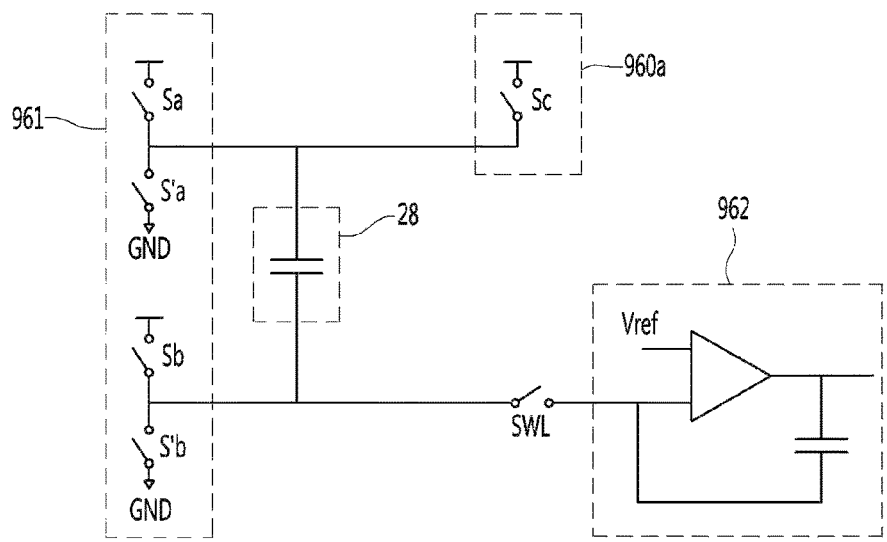
【FIG. 16】
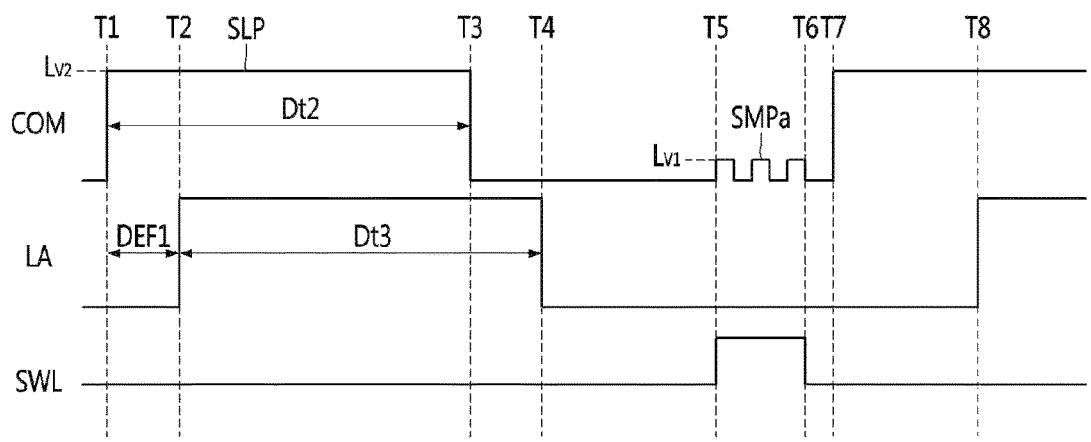

[FIG. 17]
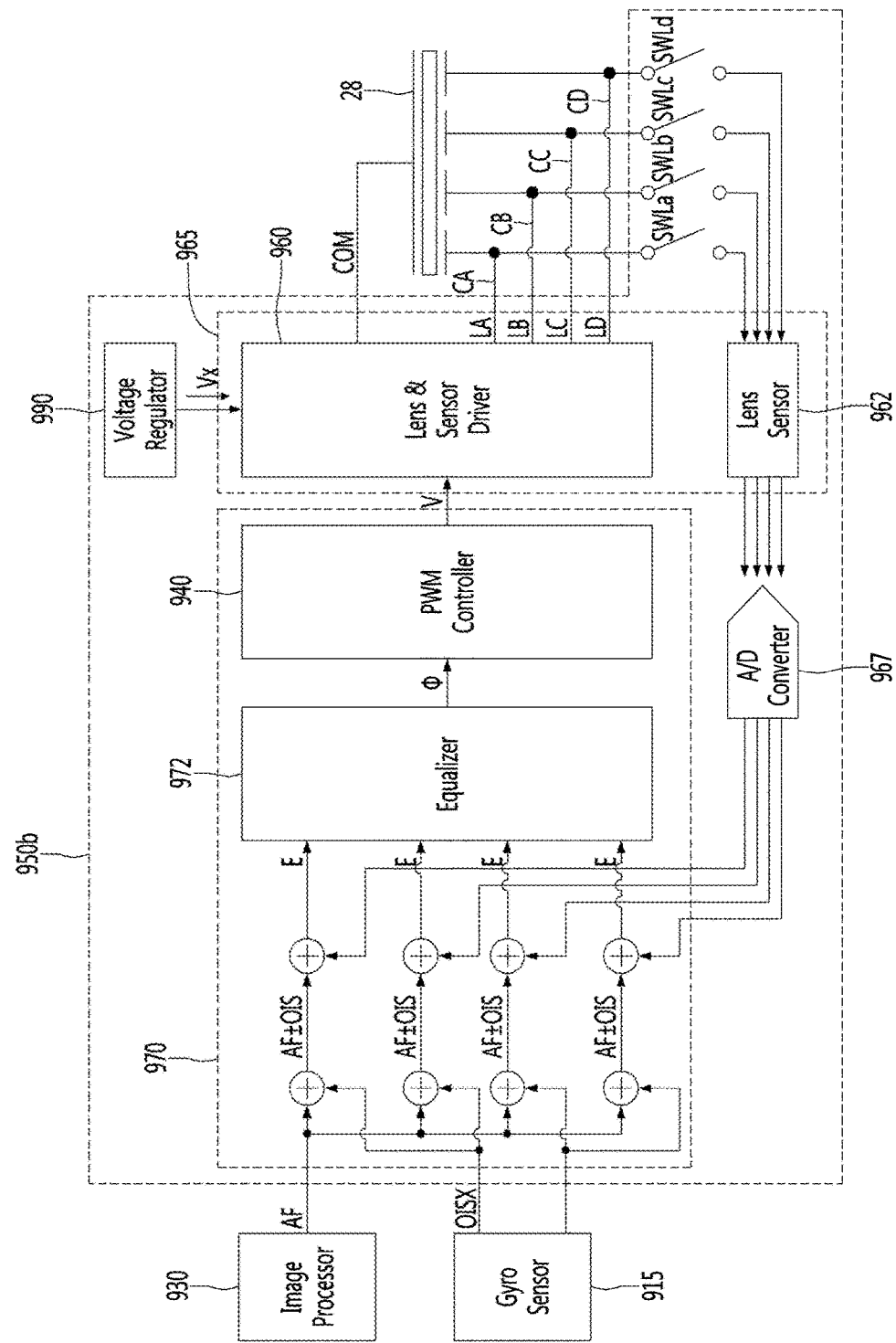

[FIG. 18]
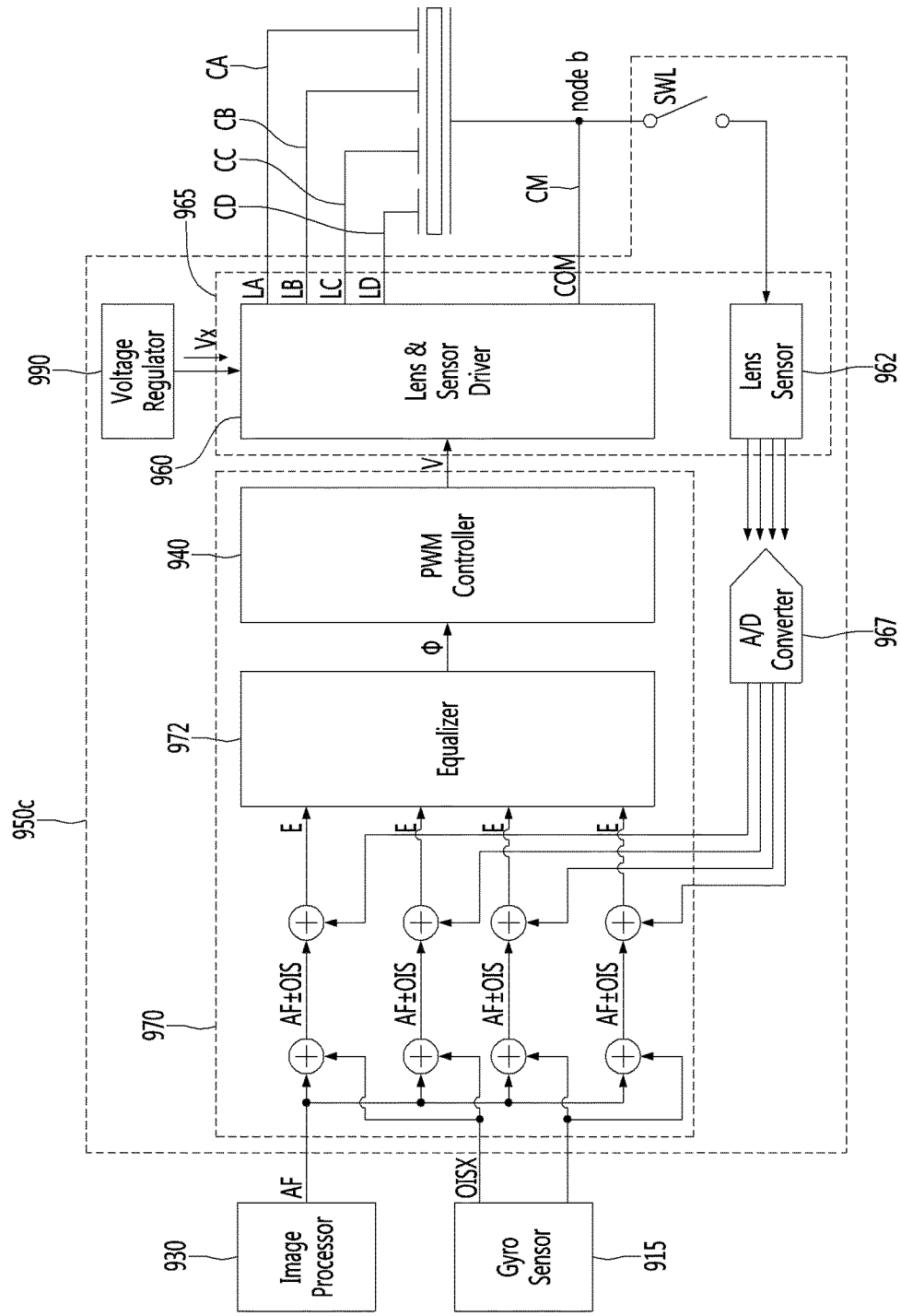

[FIG. 19]
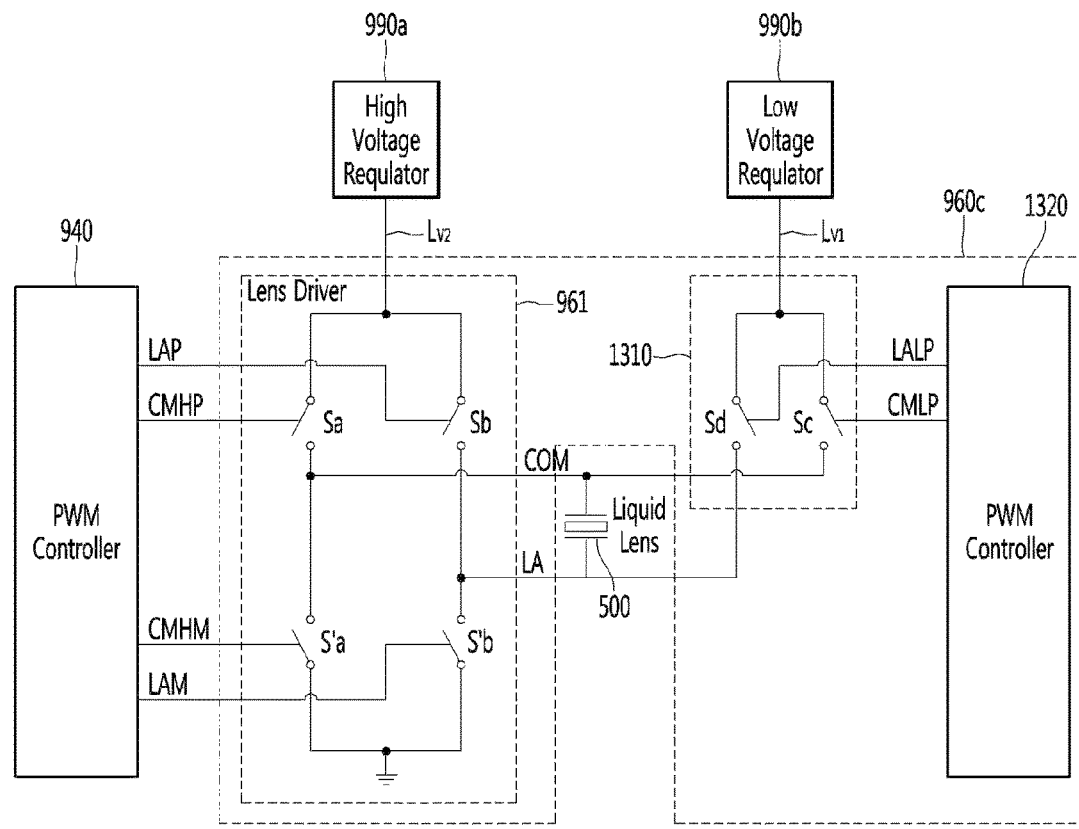
[FIG. 20]
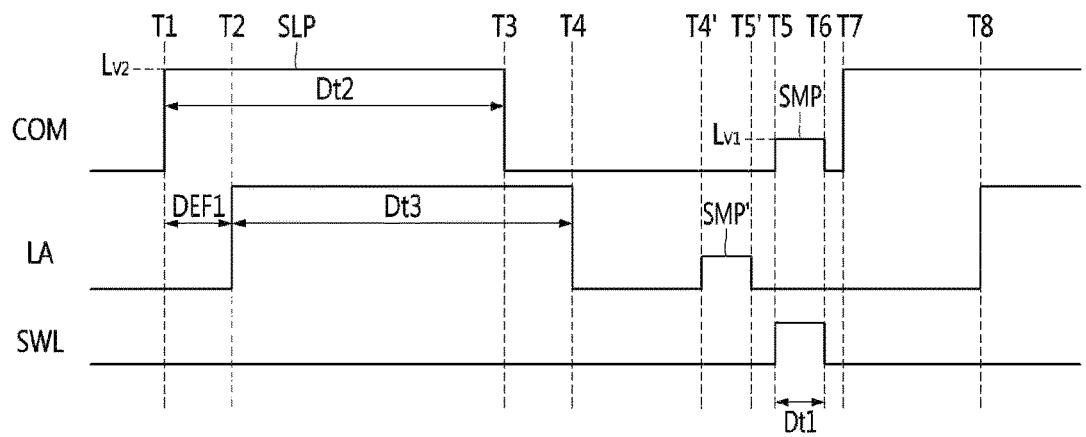

[FIG. 21]
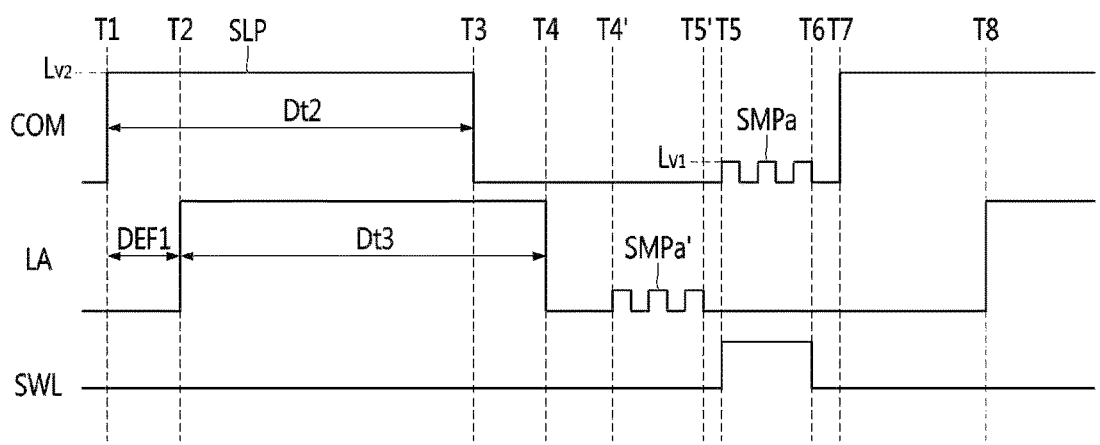

[FIG. 22]
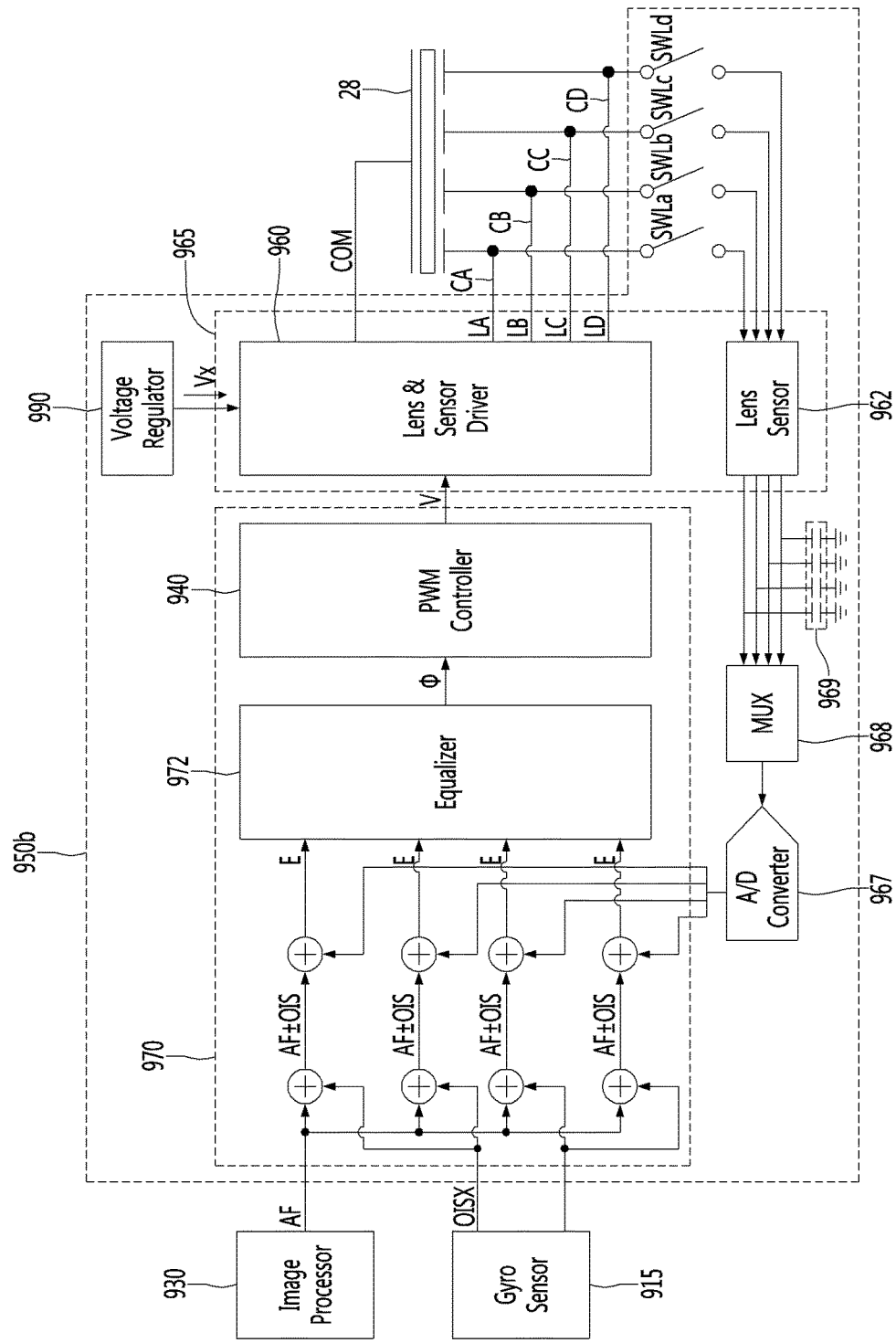

【FIG. 23】
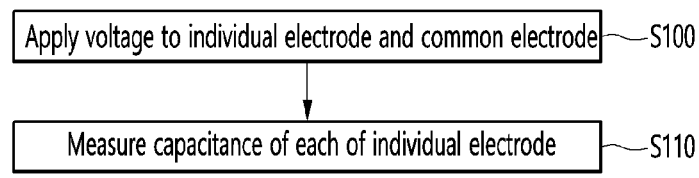
【FIG. 24】
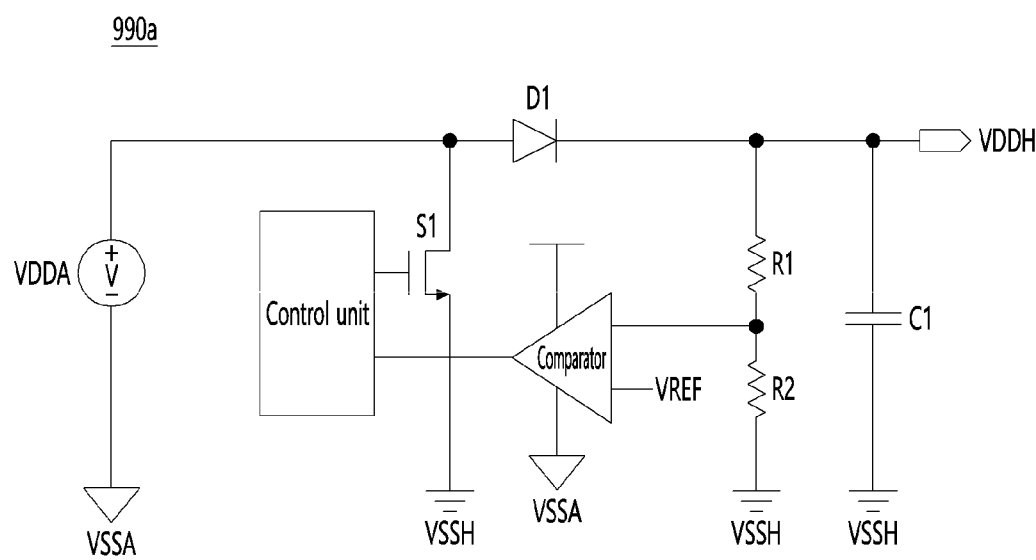

[FIG. 25a]
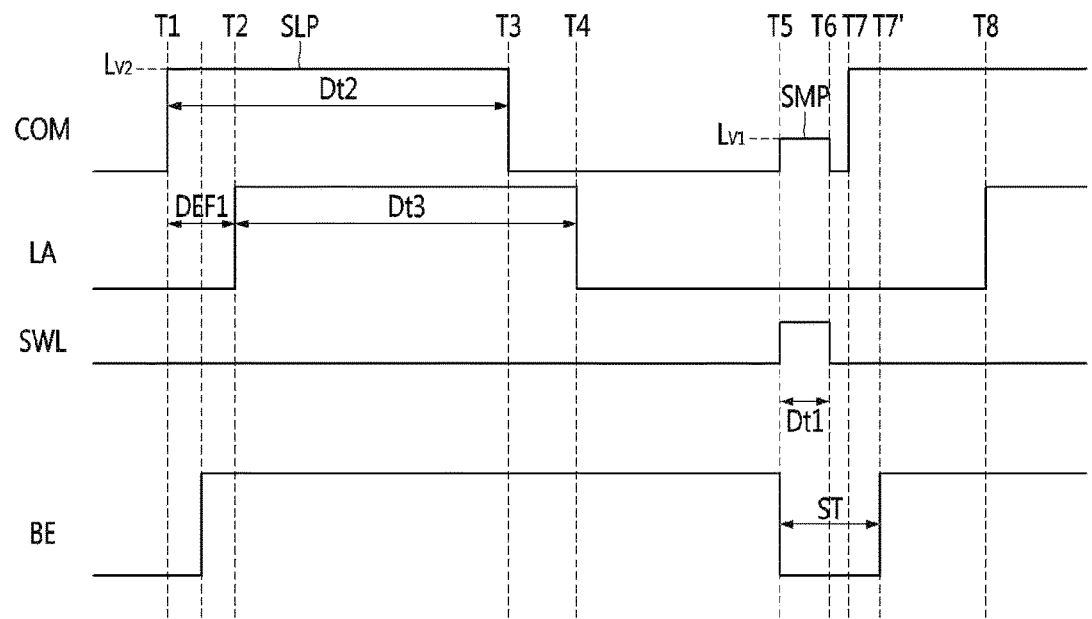
[FIG. 25b]
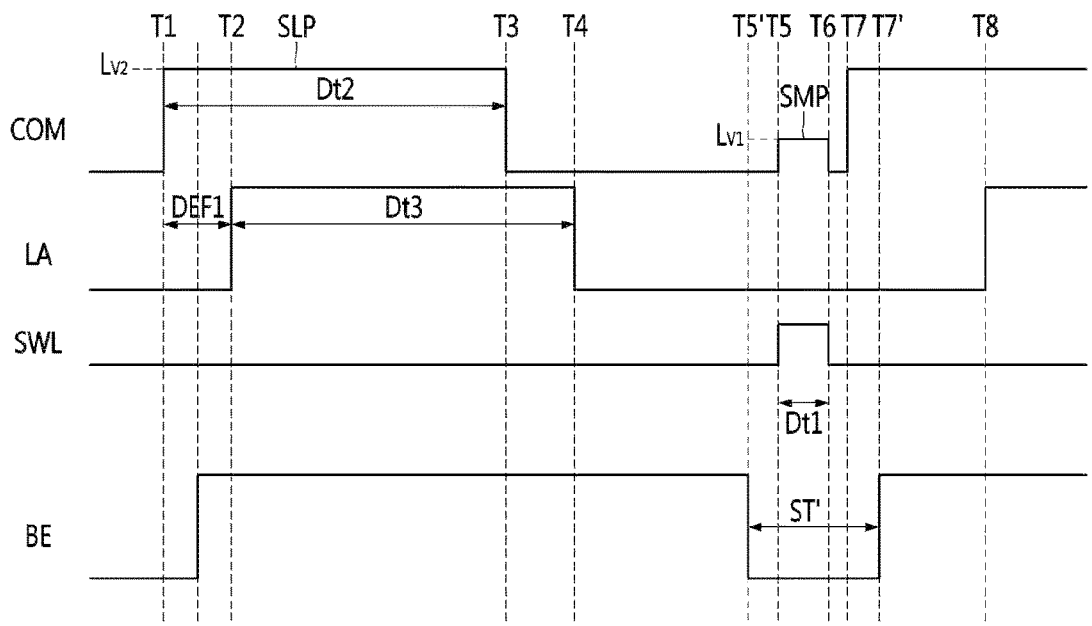

[FIG. 26]
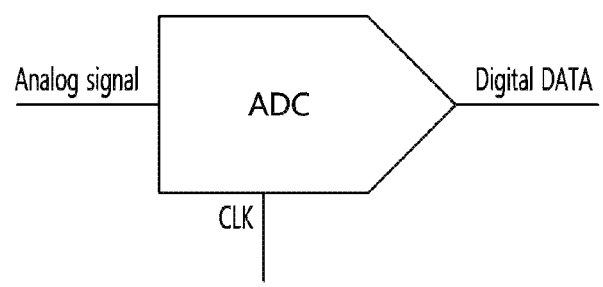
(a)
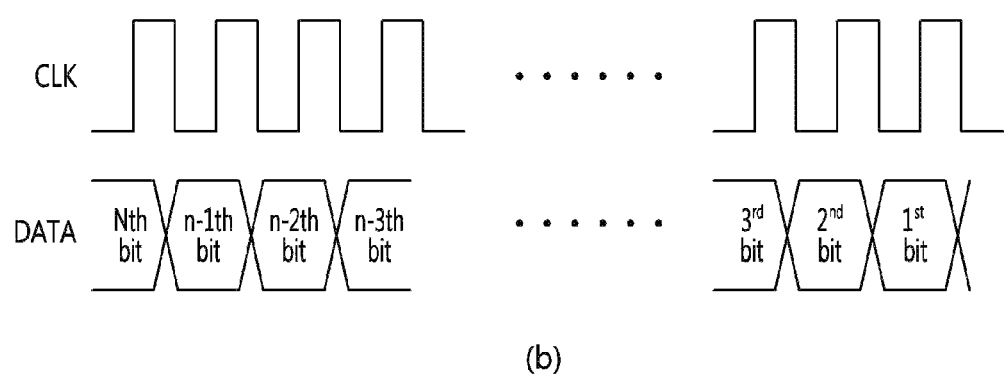
(b)

[FIG. 27a]
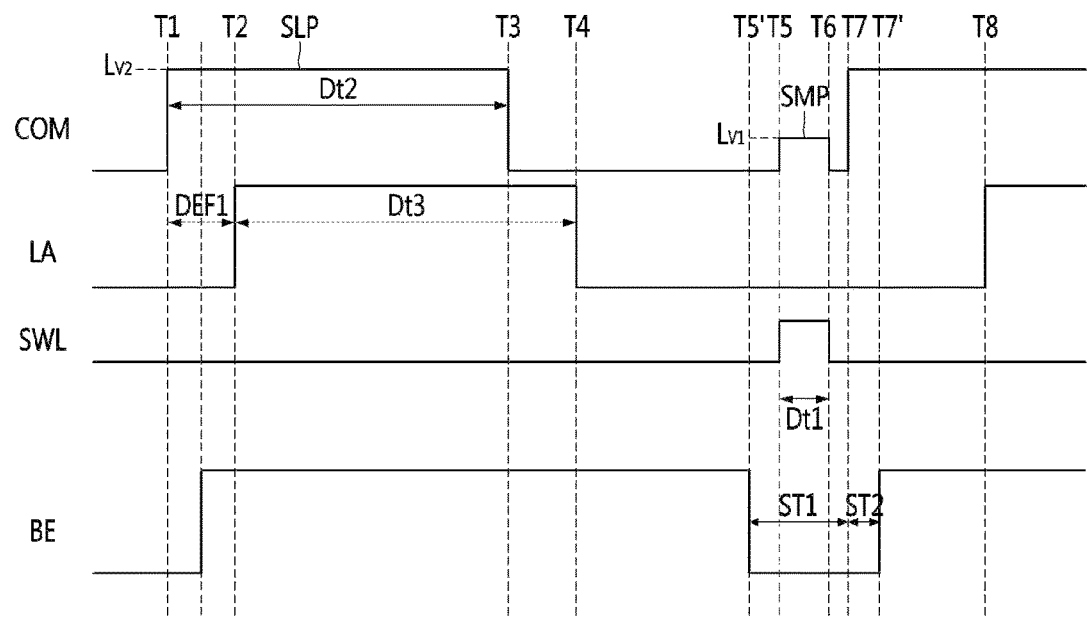
[FIG. 27b]
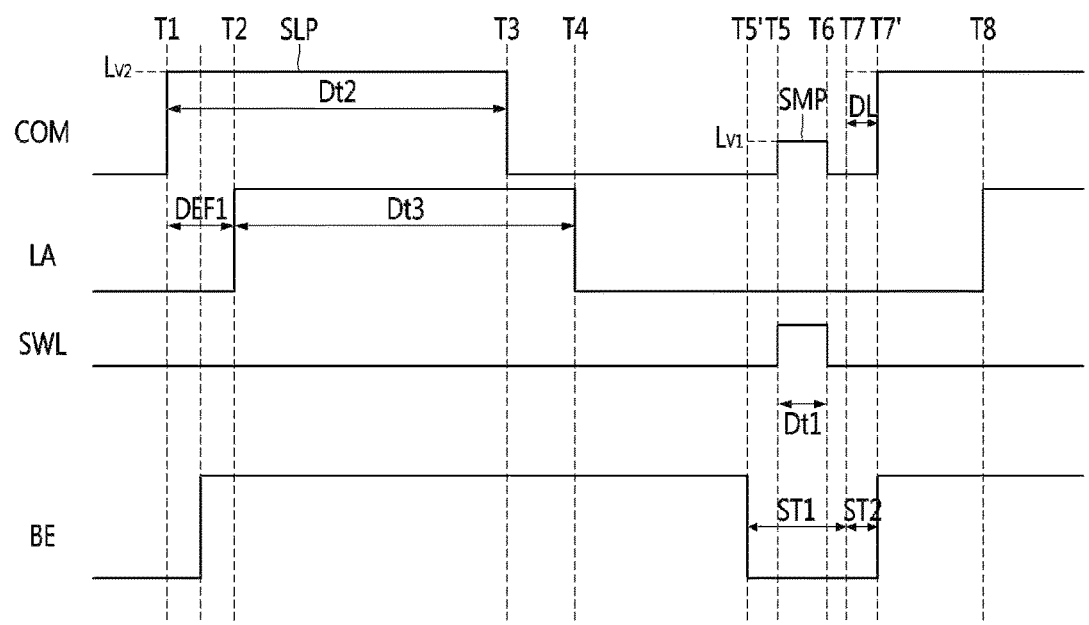

【FIG. 28】
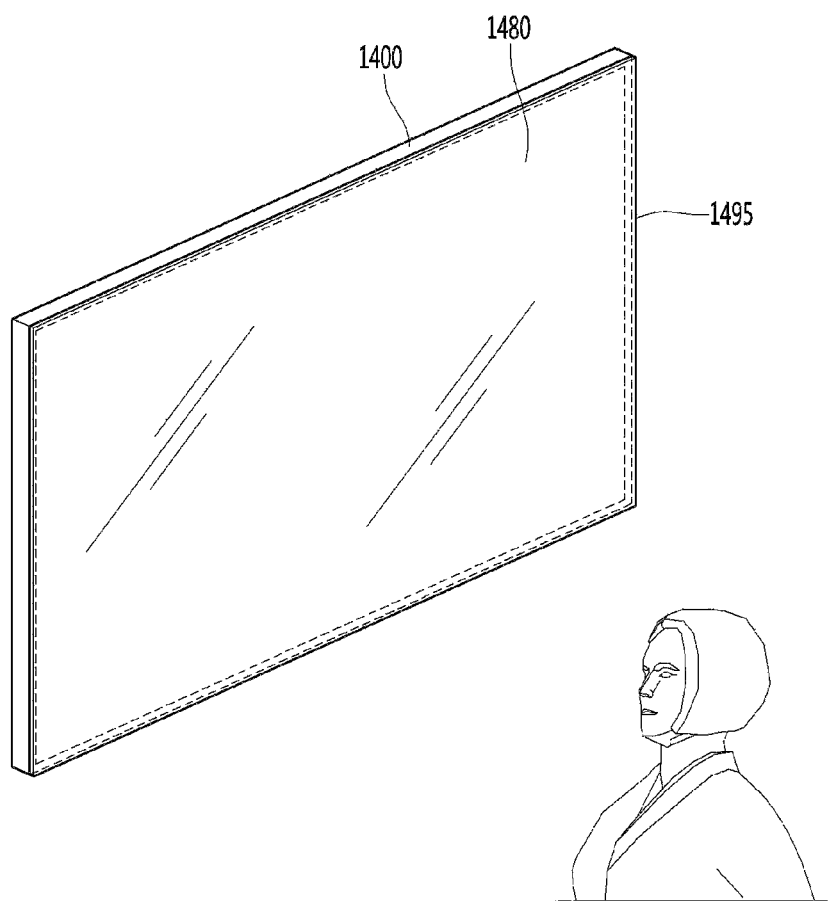

[FIG. 29]
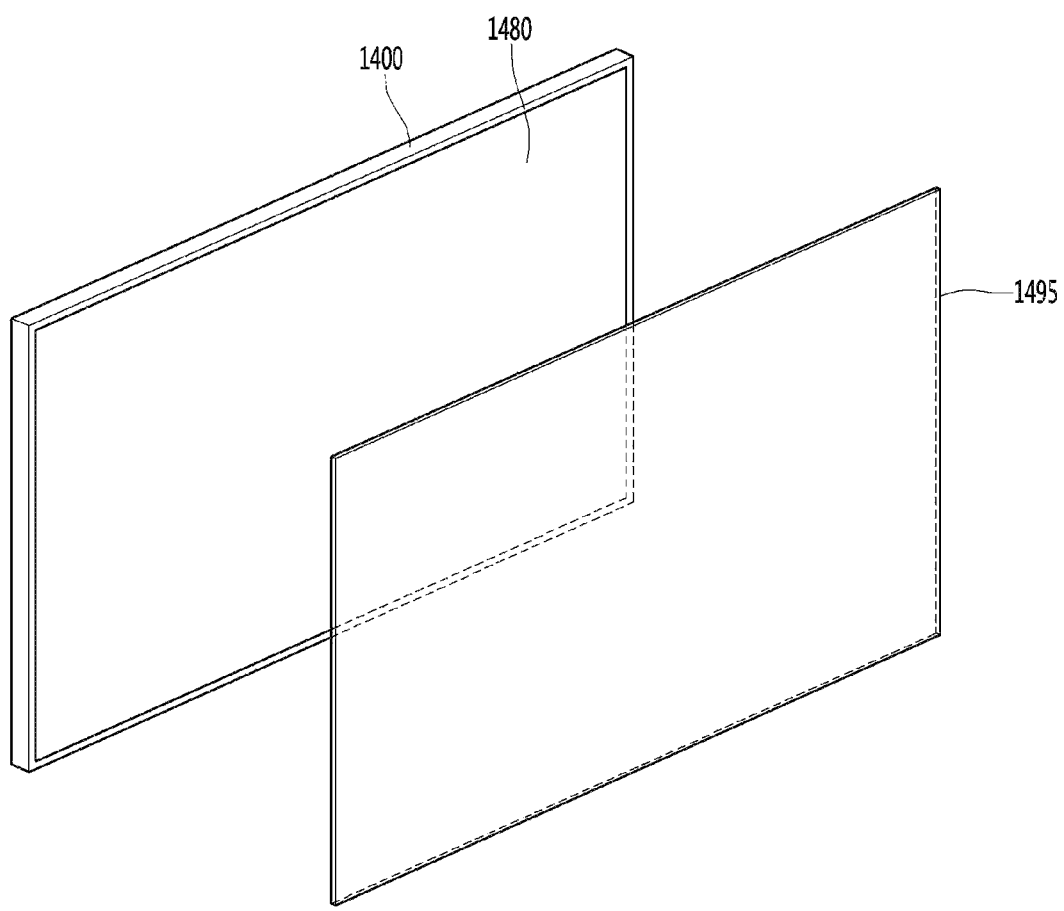

LENS CURVATURE VARIATION APPARATUS

CROSS REFERENCE TO RELATED APPLICATIONS

This application is the National Phase of PCT International Application No. PCT/KR2020/009045, filed on Jul. 9, 2020, which claims priority under 35 U.S.C. 119(a) to Patent Application No. 10-2019-0082858, filed in the Republic of Korea on Jul. 9, 2019, all of which are hereby expressly incorporated by reference into the present application.

TECHNICAL FIELD

An embodiment relates to a liquid lens control circuit, a camera module, and a liquid lens control method. More specifically, the embodiment relates to a lens curvature variation apparatus for controlling a liquid lens capable of adjusting a focal length by using an electric signal

BACKGROUND ART

Users of portable devices desire optical devices having a high resolution, a small size, various photographing functions (e.g., optical zooming function (zoom-in/zoom-out), auto-focusing (AF) function, a camera-shake correction or an optical image stabilizer (OIS) function, or the like). Although such photographing functions may be implemented by combining several lenses and directly moving the lenses, the size of the optical devices may be increased when the number of lenses is increased. The AF and camera-shake correction functions are performed by moving or tilting several lens modules, which are fixed to a lens holder to be aligned with an optical axis, along the optical axis or in a direction perpendicular to the optical axis, and a separate lens-driving device is used to drive the lens modules. However, the lens-driving device has high power consumption, and a cover glass should be separately added to a camera module in order to protect the lens-driving device, and thus the overall thickness of the lens-driving device is increased. Therefore, research has been conducted on a liquid lens that electrically adjusts a curvature of an interface between two types of liquids to perform the AF and camera-shake correction functions.

DISCLOSURE

Technical Problem

An embodiment is to provide a liquid lens control circuit, a camera module, and a liquid lens control method that may recognize movement of an interface of a liquid lens more accurately and control the interface of the liquid lens more accurately in response to an applied electric signal by providing a feedback circuit capable of recognizing a state of the interface included in the liquid lens through a change of a capacitance in a camera device including the liquid lens capable of adjusting a focal length by using an electric signal.

In addition, the embodiment is to provide a liquid lens control circuit, a camera module, and a liquid lens control method that may control a performance and operation of a liquid lens more accurately by directly recognizing a movement and shape of an interface through a change of a capacitance of the interface without converting the movement and shape of the interface of the liquid lens of which focal length may be adjusted into an optical signal image that passes through the interface.

In addition, the embodiment is to provide a liquid lens control circuit, a camera module, and a liquid lens control method that are more efficient to correct a lens distortion at a lens assembly including a liquid lens and a solid lens or to control the lens assembly because the movement and shape of the interface in the liquid lens may be recognized.

In addition, the embodiment is to provide a liquid lens control circuit, a camera module, and a liquid lens control method that may reduce sensing noise generated by a switching operation of a power supply unit by turning off a switch of the power supply unit when a movement and shape of an interface are recognized through a change of a capacitance of the interface of a liquid lens.

In addition, the embodiment is to provide a liquid lens control circuit, a camera module, and a liquid lens control method that may reduce sensing noise generated by a switching operation of a lens driver by preventing the switching operation of the lens driver from being changed in a data lead time of an analog-digital converter of a sensing time for recognizing a movement and shape of an interface through a change of a capacitance of the interface of a liquid lens.

Technical problems to be solved in the present invention are not limited to the above-mentioned technical problems, and other technical problems not mentioned will be clearly understood by a person having an ordinary skill in the art to which the present invention pertains, from following descriptions.

Technical Solution

A lens curvature variation apparatus according to an embodiment includes: a liquid lens including a first electrode and a second electrode, and containing a first liquid and a second liquid forming an interface with each other; a voltage booster including a first switching element, and converting an input voltage into a voltage of a first level higher than the input voltage by a switching operation of the first switching element; a lens driver applying a driving voltage for adjusting the interface to the first electrode and the second electrode by using the voltage of the first level; a sensor unit sensing the interface controlled by the driving voltage; and a control unit controlling the lens driver so that the liquid lens forms a target interface based on information of the interface sensed by the sensor unit, wherein the voltage booster is deactivated during a sensing time at which the interface of the liquid lens is sensed by the sensor unit.

In addition, the voltage booster is controlled by an activation signal (Booster Enable) into an activated state and a deactivated state, and the activation signal is controlled so that an operation of the voltage booster is deactivated during the sensing time.

In addition, a state of the first switch maintains an on-state or an off-state to deactivate an operation of the voltage booster during the sensing time.

In addition, the lens driver includes: a driving voltage driver that supplies the driving voltage to the first electrode and the second electrode by using the voltage of the first level; and a sensing voltage driver supplying a sensing pulse of a second level lower than the first level to the first electrode or the second electrode.

In addition, the lens curvature variation apparatus includes a sensing voltage supply unit that converts the input voltage into the voltage of the second level to supply it to the sensing voltage driver.

In addition, the lens curvature variation apparatus includes an AD converter that converts an analog signal output by the sensor unit into digital data, wherein the sensor unit senses a capacitance corresponding to a position of the interface of the liquid lens, and outputs an analog signal corresponding to the sensed capacitance to the AD converter.

In addition, the sensing time is from a time at which the sensing pulse is supplied to a time at which the conversion into the digital data is completed.

Advantageous Effects

According to an embodiment of the present invention, it is possible to vary a curvature of a lens quickly and accurately by including a liquid lens having a variable curvature based on an applied electric signal, a lens driver driving a liquid, a sensor sensing a capacitance of the liquid lens, and a control unit controlling the lens driver so that the curvature of the lens is varied based on the sensed capacitance of the liquid lens.

In particular, in the embodiment, it is possible to vary the curvature of the liquid lens quickly and accurately by sensing the capacitance of the liquid lens and feeding it back, and changing a driving voltage applied to the liquid lens so that the curvature of the liquid lens is varied.

Meanwhile, it is possible to vary the curvature of the lens quickly and accurately by including an equalizer that calculates a curvature error based on a calculated curvature and a target curvature, and a pulse width variable controller that generates and outputs a pulse width signal based on the calculated curvature error.

Meanwhile, the sensor according to the embodiment may sense the capacitance of the liquid lens quickly and accurately by sensing the capacitance of the liquid lens during a turn-on period of a switching element.

In addition, in the embodiment, it is possible to sense the curvature of the liquid lens accurately by generating a separate sensing pulse signal for sensing the capacitance of the liquid lens, and using the sensing pulse so as to sense the capacitance.

In addition, in the embodiment, the supply of the sensing pulse and the capacitance sensing operation are performed during a period in which a ground voltage is applied to both a first electrode and a second electrode, and accordingly, sensing noise generated by the switching operation of the lens driver may be removed, and the accuracy of the sensed capacitance may be improved.

In addition, in the embodiment, it is possible to solve an operation error of the liquid lens caused by the sensing pulse by supplying an offset pulse corresponding to the sensing pulse.

In addition, in the embodiment, when recognizing a movement and shape of an interface through a change of the capacitance of the interface of the liquid lens, the sensing noise generated due to the switching operation of the power supply unit may be reduced by turning off (the operation of the power supply unit is deactivated) the switch of the power supply unit, and accordingly, the accuracy of sensing the capacitance may be improved.

In addition, in the embodiment, the sensing noise generated due to the switching operation of the lens driver may be reduced by preventing the switching operation of the lens driver from being changed at a data lead time of an analog-digital converter of the sensing time recognizing the movement and shape of the interface through the change of the capacitance of the interface of the liquid lens, and accordingly, the accuracy of the capacitance may be improved.

DESCRIPTION OF DRAWINGS

FIG. 1 shows an example of a camera device.

FIG. 2 shows an example of a lens assembly included in the camera device.

FIGS. 3A and 3B are views for describing a driving method of a liquid lens.

FIG. 4 shows a liquid lens of which focal length is adjusted according to a driving voltage.

FIGS. 5A and 5B show a structure of a liquid lens.

FIGS. 6A to 6E are views illustrating various curvatures of a liquid lens.

FIG. 7 is an example of an internal block diagram of a camera module according to an embodiment.

FIG. 8 is an example of an internal block diagram of a camera module according to an embodiment.

FIG. 9 is a diagram showing a change curve of the curvature of the liquid lens at the lens curvature variation apparatus of FIGS. 7 and 8.

FIG. 10 is an example of an internal circuit diagram of the lens driver in FIG. 8.

FIG. 11 is a modified example of the lens driver in FIG. 10.

FIG. 12 is another modified example of the lens driver in FIG. 10.

FIG. 13A is an example of a waveform diagram for describing an operation of the lens driver of FIG. 10.

FIG. 13B is a view referred to for describing an operation of a sensor unit of FIG. 10.

FIG. 14 shows an example of a circuit constituting a sensor unit.

FIG. 15 shows one example of a lens driver.

FIG. 16 is another view referred to for describing an operation of a sensor unit.

FIG. 17 is an example of an internal block diagram of a camera module according to another embodiment of the present invention.

FIG. 18 is an example of an internal block diagram of a camera module according to still another embodiment of the present invention.

FIG. 19 is a diagram showing a lens driver according to another embodiment of the present invention.

FIG. 20 is a view referred to for describing an operation of the sensor unit of FIG. 19.

FIG. 21 is a view referred to for describing an operation of a sensor unit.

FIG. 22 is one example of an internal block diagram of a camera module according to still another embodiment of the present invention.

FIG. 23 is a flowchart for describing a control method of a liquid lens according to an embodiment step by step.

FIG. 24 shows an example of a circuit constituting a first power supply unit according to an embodiment.

FIG. 25A is a view referred to for describing an operation of a first power supply unit according to a first embodiment.

FIG. 25B is a view referred to for describing an operation of a first power supply unit according to a second embodiment.

FIG. 26 is a view for describing an operation of the AD converter according to an embodiment.

FIGS. 27A and 27B are examples of waveform diagrams for describing an operation of a lens driver according to an embodiment.

FIG. 28 is a view showing an external appearance of a video display device according to one embodiment of the present invention.

FIG. 29 is a view showing an optical unit and a display of the video display device of FIG. 28 separately.

DETAILED DESCRIPTION OF THE EMBODIMENTS

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element FIG. 1 shows an example of a camera device. As shown in the drawing, a camera module may include a lens assembly 22 and an image sensor. At least one solid lens may be disposed on an upper portion or a lower portion of the lens assembly 22. The lens assembly 22 may include a liquid lens of which focal length is adjusted according to a voltage applied thereto. The camera module may include the lens assembly 22 including a first lens of which focal length is adjusted according to a driving voltage applied between a common terminal and a plurality of individual terminals, a control circuit 24 for supplying a driving voltage to the first lens, and an image sensor 26 that is aligned with the lens assembly 22, converts light transferred through the lens assembly 22 into electrical signals, and is disposed at the lower portion of the lens assembly 22.

Prior to the description of embodiments of the present invention, sensing a curvature of an interface of a liquid lens may refer sensing a state or position of the interface of the liquid lens.

Referring to FIG. 1, the camera module may include the circuit 24, 26 and the lens assembly 22 including a plurality of lenses, which are formed on a single printed circuit board (PCB), but it is merely one example and the scope of the disclosure is not limited thereto. A configuration of the control circuit 24 may be designed differently according to specifications required in the camera module. In particular, when reducing a magnitude of a voltage applied to a liquid lens 28, the control circuit 24 may be implemented in a single chip. Thus, a size of the camera module mounted on a portable device may be further reduced.

Referring to FIG. 1, as shown in the drawing, the lens assembly 22 may include a first lens unit 100, a second lens unit 200, a liquid lens unit 300, a lens holder 400, and a connecting unit 500. The connection unit 500 may electrically connect an image sensor and a liquid lens to each other, and may include a substrate, a wire, an electrical line, or the like, which will be described later. The illustrated structure of the lens assembly 22 is merely one example, and the structure of the lens assembly 22 may be changed according to specifications required in the camera module. For example, the liquid lens unit 300 is located between the first lens unit 100 and the second lens unit 200. However, in another example, the liquid lens unit 300 may be located above (in front of) the first lens unit 100, and one of the first lens unit 100 and the second lens unit 200 may be omitted. The configuration of the control circuit 24 may be designed differently according to specifications required in the camera device. In particular, when reducing a magnitude of a voltage applied to the lens assembly 22, the control circuit 24 may be implemented in a single chip. Thus, a size of the camera device mounted on a portable device may be further reduced.

FIG. 2 shows an example of a lens assembly 22 included in the camera device.

As shown in the drawing, the lens assembly 22 may include a first lens unit 100, a second lens unit 200, a liquid lens unit 300, a lens holder 400, and a connecting unit 500. The connection unit 500 may electrically connect an image sensor and a liquid lens to each other, and may include a substrate, a wire, an electrical line, or the like, which will be described later. The illustrated structure of the lens assembly 22 is merely one example, and the structure of the lens assembly 22 may be changed according to specifications required in the camera module. For example, the liquid lens unit 300 is located between the first lens unit 100 and the second lens unit 200. However, in another example, the liquid lens unit 300 may be located above (in front of) the first lens unit 100, and one of the first lens unit 100 and the second lens unit 200 may be omitted.

Referring to FIG. 2, the first lens unit 100 is disposed in front of the lens assembly 22, and is a part in which light is incident from the outside of the lens assembly 22. The first lens unit 100 may include at least one lens, or two or more lenses may be aligned with respect to a central axis (PL) to form an optical system.

The first lens unit 100 and the second lens unit 200 may be mounted on the lens holder 400. In this case, a through-hole may be formed at the lens holder 400, and the first lens unit 100 and the second lens unit 200 may be disposed in the through-hole. In addition, the liquid lens unit 300 may be inserted into a space between the first lens unit 100 and the second lens unit 200, which are disposed in the lens holder 400.

Meanwhile, the first lens unit 100 may include a solid lens 110. The solid lens 110 may protrude outside the lens holder 400 to be exposed to the outside. When the solid lens 110 is exposed to the outside, a surface of the lens may be damaged. When the surface of the lens is damaged, quality of an image photographed by the camera module may be deteriorated. In order to prevent or suppress the surface damage of the solid lens 110, a cover glass may be disposed, a coating layer may be formed, or a method of using a wear resistant material for preventing the surface damage of the solid lens 100 may be applied.

The second lens unit 200 may be disposed behind the first lens unit 100 and the liquid lens unit 300, and light incident on the first lens unit 100 from the outside may pass through the liquid lens unit 300 to be incident on the second lens unit 200. The second lens unit 200 may be spaced apart from the first lens unit 100 to be disposed in the through-hole formed in the lens holder 400.

Meanwhile, the second lens unit 200 may include at least one lens, and when two or more lenses are included, the second lens unit 200 may be aligned with respect to the central axis (PL) to form an optical system.

The liquid lens unit 300 may be disposed between the first lens unit 100 and the second lens unit 200, and may be inserted into an insertion opening 410 in the lens holder 400. The insertion opening 410 may be formed by opening a portion of a side surface of the lens holder 400. That is, the liquid lens may be disposed to be inserted through the insertion opening 410 in the side surface of the lens holder 400. The liquid lens unit 300 may also be aligned with respect to the center axis PL like the first lens unit 100 and the second lens unit 200.

The liquid lens unit 300 may include a lens region 310. The lens region 310 is a region through which light passed through the first lens unit 100 is transmitted, and at least a part thereof may contain a liquid. For example, the lens region 310 may include two types of liquids, i.e., a conductive liquid and a non-conductive liquid together, and the conductive liquid and the non-conductive liquid may form a boundary surface without being mixed with each other. The boundary surface between the conductive liquid and the non-conductive liquid may be deformed by a driving voltage applied through the connection unit 500 to change a curvature of an interface of the liquid lens 28 or a focal length of the liquid lens. When the deformation of the boundary surface or the change of the curvature is controlled, the liquid lens unit 300 and the camera module including the same may perform an auto-focusing function, a camera-shake correction function, and the like.

FIGS. 3A and 3B are views for describing a driving method of a liquid lens.

First, (a) of FIG. 3A illustrates that a first voltage V1 is applied to the liquid lens 28 so that the liquid lens operates like a concave lens.

Next, (b) of FIG. 3A illustrates that a second voltage V2 larger than the first voltage V1 is applied to the liquid lens 28 so that the liquid lens does not change a traveling direction of light.

Next, (c) of FIG. 3A illustrates that a third voltage V3 larger than the second voltage V2 is applied to the liquid lens 28 so that the liquid lens operates like a convex lens.

Meanwhile, FIG. 3A illustrates that a curvature or a diopter of the liquid lens is changed depending on a level of the applied voltage, but the embodiment is not limited thereto, and the curvature or the diopter of the liquid lens may be changed depending on a pulse width of an applied pulse.

Next, (a) of FIG. 3B illustrates that the interfaces in the liquid lens 28 have the same curvature so that the liquid lens operates like a convex lens.

That is, according to (a) of FIG. 3B, incident light Lpaa is concentrated and corresponding output light Lpab is output.

Next, (b) of FIG. 3B illustrates that the traveling direction of light is changed upward as an interface in the liquid lens 28 has an asymmetric curved surface.

That is, according to (b) of FIG. 3B, the incident light Lpaa is concentrated upward, and corresponding output light Lpac is output.

FIG. 4 shows a liquid lens of which focal length is adjusted according to a driving voltage. Specifically, (a) shows the liquid lens 28 included in the lens assembly 22 (see FIG. 2), and (b) shows an equivalent circuit of the liquid lens 28.

First, referring to (a) of FIG. 4, the liquid lens 28 of which focal length is adjusted according to the driving voltage may be applied with a voltage via individual terminals LA, LB, LC, and LD disposed in four different directions with the same distance. The individual terminals may be disposed with the same distance with respect to the central axis of the liquid lens, and may include four individual terminals. The four individual terminals may be disposed at four corners of the liquid lens, respectively. When the voltage is applied via the individual terminals L1, L2, L3, and L4, a boundary surface between a conductive liquid and a non-conductive liquid disposed in the lens region 310 may be deformed by the driving voltage which is generated by interaction between the applied voltage and a voltage applied to a common terminal CO described later.

In addition, referring to (b) of FIG. 4, the lens 28 is applied with an operating voltage from different individual terminals LA, LB, LC, and LD at one side thereof, and the other side of the lens 28 may be described as a plurality of capacitors 30 connected to the common terminal COM. Here, the plurality of capacitors 30 included in the equivalent circuit may have a small capacitance of about several tens to 200 pico-farads (pF) or less. The electrodes of the liquid lens described above may also be referred to as terminals, electrode sectors, or sub-electrodes in this disclosure.

FIGS. 5A and 5B show a structure of a liquid lens.

As shown in FIG. 5A, the liquid lens 28 may include liquids, a first plate, and electrodes. Liquids 122 and 124 accommodated in the liquid lens 28 may include a conductive liquid and a non-conductive liquid. A first plate 114 may include a cavity 150 or a hole in which the conductive liquid and the non-conductive liquid are disposed. The cavity 150 may have an inclined surface. Electrodes 132 and 134 may be disposed on the first plate 114, and may be disposed above the first plate 114 or below the first plate 114.

The liquid lens 28 may further include a second plate 112, which may be disposed above (below) the electrodes 132 and 134. In addition, the liquid lens 28 may further include a third plate 116, which may be disposed below (above) the electrodes 132 and 134.

As shown in the drawing, one embodiment of the liquid lens 28 may include an interface 130 formed by different first and second liquids 122 and 124. In addition, at least one substrate 142 and 144 for supplying a voltage to the liquid lens 28 may be included. A corner of the liquid lens 28 may be thinner than a central portion of the liquid lens 28. The second plate may be disposed on an upper surface of the liquid lens and the third plate may be disposed on a lower surface of the liquid lens, but the second plate or the third plate is not disposed on a part of the upper surface or the lower surface of the corner of the liquid lens, and thus a thickness of the corner of the liquid lens may be thinner than that of the center portion thereof. The electrodes may be exposed from the upper surface or the lower surface of the corner of the liquid lens.

The liquid lens 28 may include two different types of liquids, for example, the first liquid 122 and the second liquid 124, and a curvature and shape of the interface 130 formed by the first and second liquids 122 and 124 may be adjusted by a driving voltage supplied to the liquid lens 28.

In this case, the first liquid 122 may be a conductive liquid. In addition, the second liquid 124 may be a non-conductive liquid.

The first liquid 122 has conductivity, and for example, may be formed by mixing ethylene glycol and sodium bromide (NaBr).

The second liquid 124 may be oil, for example, phenyl-based silicone oil.

Each of the first liquid 122 and the second liquid 124 may include at least one of a germicide or an antioxidant. The antioxidant may be a phenyl type antioxidant or a phosphorus (P) type antioxidant. In addition, the germicide may be any one of alcohol type, aldehyde type, and phenol type germicide. As described above, when each of the first liquid 122 and the second liquid 124 contains the antioxidant and the germicide, it is possible to prevent the first and second liquids 122 and 124 from being oxidized or prevent changes in physical properties of the first and second liquids 122 and 124 due to growth of microorganisms.

That is, a plurality of first and second liquids 122 and 124 may be accommodated in a cavity, and may include the first liquid 122 having conductivity and the second liquid (or insulating liquid) 124 having non-conductivity. The first liquid LQ1 and the second liquid LQ2 do not mix with each other, and the interface 130 may be formed at a contact portion between the first and second liquids 122 and 124. For example, the second liquid 124 may be disposed on the first liquid 122, but the embodiment is not limited thereto. For example, unlike the one shown in the drawing, the first liquid 122 may be disposed on the second liquid 124.

In this case, the first liquid 122 and the second liquid 124 may be accommodated in the cavity at different specific gravities.

That is, in case of the liquid lens, a curvature, a position, a shape, and the like of the interface 130 between the first liquid 122 and the second liquid 124 may be changed by using a voltage of the electrode to perform an autofocusing function of a camera. In addition, in the case of the liquid lens, the curvature of the interface is shown asymmetrically with respect to a center of an optical axis by applying asymmetrically the voltage applied to a plurality of electrodes, thereby performing a camera-shake prevention function.

Meanwhile, the driving voltage supplied to the liquid lens 28 may be transmitted via the connection unit 500. The connection unit may include at least one of the first substrate 142 and the second substrate 144. When the connection unit includes the first substrate 142 and the second substrate 144, the second substrate 144 may transmit a voltage to each of a plurality of individual terminals, and the first substrate 142 may transmit a voltage to a common electrode. The number of the plurality of individual terminals may be four, and the second substrate 144 may transmit a voltage to each of the four individual terminals. The voltage supplied via the second substrate 144 and the first substrate 142 may be applied to the plurality of electrodes 134 and 132 disposed at or exposed from each corner of the liquid lens 28.

In addition, the liquid lens 28 may include the third plate 116 and the second plate 112 containing a transparent material and the first plate 114 located between the third plate 116 and the second plate 112 and including an open region having a predetermined inclined surface.

Further, the liquid lens 28 may include the cavity 150, which is defined by the third plate 116, the second plate 112, and the open region of the first plate 114. Here, the cavity 150 may be filled with the first and second liquids 122 and 124 of different types (e.g., the conductive liquid and the non-conductive liquid) as described above, and the interface 130 may be formed between the first and second liquids 122 and 124 of different types.

In addition, at least one of the two liquids 122 and 124 accommodated in the liquid lens 28 may be conductive, and the liquid lens 28 may include the two electrodes 132 and 134 disposed above and below the first plate 114. The first plate 114 may have the inclined surface and may further include an insulating layer 118 disposed on the inclined surface. The conductive liquid may be in contact with the insulating layer 118. Here, the insulating layer 118 may cover one of the two electrodes 132 and 134 (e.g., the individual electrode 134), and may cover or expose a portion of the other electrode (e.g., the common electrode 132) so as to apply electrical energy to the conductive liquid (e.g., 122). Here, the common electrode 132 may include at least one electrode sector (e.g. COM), and the individual electrode 134 may include two or more electrode sectors (e.g., LA, LB, LC, and LD). For example, the individual electrode 134 may include a plurality of electrode sectors, which are sequentially disposed in a clockwise direction with respect to the optical axis. The electrode sectors may be referred to as sub-electrodes or terminals of the liquid lens.

One or a plurality of substrates 142 and 144 for transmitting a voltage may be connected to the two electrodes 132 and 134 included in the liquid lens 28. The focal length of the liquid lens 28 may be adjusted while changing the curvature, bending or inclination of the interface 130 formed in the liquid lens 28 according to the driving voltage.

Referring to FIG. 5B, a first individual electrode LA (134a) and a second individual electrode LB (134b) among the plurality of individual electrodes LA to LD (134a to 134d), are formed to be inclined, and it is illustrated that the size decreases from a lower portion to an upper portion.

Meanwhile, unlike FIG. 5B, the plurality of individual electrodes LA to LD (134a to 134d) may be formed at the upper portion, which is the position of the common electrode 132, and the common electrode 132 may also be formed at the lower portion.

Meanwhile, FIGS. 5A and 5B illustrate four electrodes as the plurality of individual electrodes, but the embodiment is not limited thereto, and two or more various numbers of electrodes may be formed.

Meanwhile, in FIG. 5B, after a pulse-shaped voltage is applied to the common electrode 132, when the pulse-shaped voltage is applied to the first individual electrode LA (134a) and the second individual electrode LB (134b) after a predetermined time, a potential difference occurs between the common electrode 132 and the first individual electrode LA (134a) and the second individual electrode LB (134b), and accordingly, a shape of the first liquid 122 having conductivity is changed, and a shape of the interface 130 in the liquid lens 28 is changed in response to the change in the shape of the first liquid 122.

Meanwhile, the present embodiment provides a method for sensing simply and quickly the curvature of the interface 130 formed according to electric signals applied to each of the plurality of individual electrodes LA to LD (134a to 134d) and the common electrode 132.

To this end, a sensor unit in the present invention senses a size or change of an area of a boundary region Ac0 between the insulating layer 118 on any one individual electrode (e.g., the first individual electrode 134a) of the individual electrodes in the liquid lens 28 and the first liquid 122.

FIG. 5B illustrates AM0 as the area of the boundary region Ac0. In particular, it is illustrated that the area of the boundary region Ac0 in contact with the first liquid 122 in the inclined portion of the insulating layer 118 on the first individual electrode 134a is AM0.

FIG. 5B illustrates that the interface 130 is not concave or convex, and as an example, is in parallel with the first plate 114 or the like. In this case, the curvature of the interface 130, for example, may be defined as 0.

Meanwhile, as shown in FIG. 5B, a capacitance C may be formed in the boundary region Ac0 in contact with the first liquid 122 in the inclined portion of the insulating layer 118 on the first individual electrode 134a according to the following Equation 1.

$$C = \varepsilon \frac{A}{d} \qquad \text{[Equation 1]}$$

Here, ε may represent a dielectric constant of the insulating layer 118 that is a dielectric, A may represent an area of the boundary region Ac0, and d may represent a thickness of the insulating layer 118.

Here, assuming that εd is a fixed value, it is possible that the area of the boundary region Ac0 has a great influence on the capacitance C.

That is, the larger the area of the boundary region Ac0, the larger the capacitance C formed in the boundary region Ac0.

Meanwhile, the more the curvature of the interface 130 is changed, the more the area of the boundary region Ac0 is changed, and thus, in the embodiment, the sensor unit may be used to sense the area of the boundary region Ac0, or to sense the capacitance C formed in the boundary region Ac0.

Meanwhile, the capacitance of FIG. 5B may be defined as CAc0.

FIGS. 6A to 6E are views illustrating various curvatures of a liquid lens 28.

First, FIG. 6A illustrates that a first curvature 130a is formed at the interface 130 based on the pulse-shaped voltage applied to the plurality of individual electrodes LA to LD (134a to 134d) and the common electrode 132, respectively.

FIG. 6A illustrates AMa (>AM0) as an area of a boundary region Aaa as the first curvature 130a is formed at the interface 130. In particular, it is illustrated that the area of the boundary region Aaa in contact with the first liquid 122 in the inclined portion of the insulating layer 118 on the first individual electrode 134a is AMa.

According to the Equation 1, the area of the boundary region Aaa in FIG. 6A is larger than that of FIG. 5B, so that a capacitance of the boundary region Aaa becomes larger. Meanwhile, the capacitance of FIG. 6A may be defined as CAaa, and has a larger value than CAc0 that is the capacitance of FIG. 5B.

At this time, the first curvature 130a may be defined as having a positive polarity value. For example, the first curvature 130a may be defined as having a +2 level.

Next, FIG. 6B illustrates that a second curvature 130b is formed at the interface 130 based on the pulse-shaped voltage applied to the plurality of individual electrodes LA to LD (134a to 134d) and the common electrode 132, respectively.

FIG. 6B illustrates AMb (>AMa) as an area of a boundary region Aba as the second curvature 130b is formed at the interface 130. In particular, it is illustrated that the area of the boundary region Aba in contact with the first liquid 122 in the inclined portion of the insulating layer 118 on the first individual electrode 134a is AMb.

According to Equation 1, the area of the boundary region Aba in FIG. 6B is larger than that of FIG. 6A, so that a capacitance of the boundary region Aba becomes larger. Meanwhile, the capacitance of FIG. 6B may be defined as CAba, and has a larger value than CAaa that is the capacitance of FIG. 6A.

At this time, the second curvature 130b may be defined as having a positive polarity value smaller than the first curvature 130a. For example, the second curvature 130b may be defined as having a +4 level.

Meanwhile, according to FIGS. 6A and 6B, the liquid lens 28 operates as a convex lens, and accordingly, output light LP1a in which incident light LP1 is concentrated is output.

Next, FIG. 6C illustrates that a third curvature 130c is formed at the interface 130 based on the pulse-shaped voltage applied to the plurality of individual electrodes LA to LD (134a to 134d) and the common electrode 132, respectively.

In particular, FIG. 6C illustrates AMa as an area of a left boundary region Aca, and illustrates AMb (>AMa) as an area of a right boundary region Acb.

In particular, it is illustrated that the area of the boundary region Aca in contact with the first liquid 122 in the inclined portion of the insulating layer 118 on the first individual electrode 134a is AMa, and the area of the boundary region Acb in contact with the first liquid 122 in the inclined portion of the insulating layer 118 on the second individual electrode 134b is AMb.

Accordingly, a capacitance of the left boundary region Aca may be CAaa, and a capacitance of the right boundary region Acb may be Caba.

At this time, the third curvature 130c may be defined as having a positive polarity value. For example, the third curvature 130c may be defined as having a +3 level.

Meanwhile, according to FIG. 6C, the liquid lens 28 operates as a convex lens, and accordingly, output light LP1b in which incident light LP1 is further concentrated on one side is output.

Next, FIG. 6D illustrates that a fourth curvature 130d is formed at the interface 130 based on the pulse-shaped voltage applied to the plurality of individual electrodes LA to LD (134a to 134d) and the common electrode 132, respectively.

FIG. 6D illustrates AMd (<AM0) as an area of a boundary region Ada as the fourth curvature 130d is formed at the interface 130. In particular, it is illustrated that the area of the boundary region Ada in contact with the first liquid 122 in the inclined portion of the insulating layer 118 on the first individual electrode 134a is AMd.

According to the Equation 1, the area of the boundary region Ada in FIG. 6D is smaller than that of FIG. 5BC, so that a capacitance of the boundary region Ada becomes smaller. Meanwhile, the capacitance of FIG. 6D may be defined as CAda, and has a smaller value than CAc0 that is the capacitance of FIG. 6C.

At this time, the fourth curvature 130d may be defined as having a negative polarity value. For example, the fourth curvature 130d may be defined as having a −2 level.

Next, FIG. 6E illustrates that a fifth curvature 130e is formed at the interface 130 based on the pulse-shaped voltage applied to the plurality of individual electrodes LA to LD (134a to 134d) and the common electrode 132, respectively.

FIG. 6E illustrates AMe (<AMd) as an area of a boundary region Aea as the fifth curvature 130e is formed at the interface 130. In particular, it is illustrated that the area of the boundary region Aea in contact with the first liquid 122 in the inclined portion of the insulating layer 118 on the first individual electrode 134a is AMe.

According to the Equation 1, the area of the boundary region Aea in FIG. 6E is smaller than that of FIG. 6D, so that a capacitance of the boundary region Aea becomes smaller. Meanwhile, the capacitance of FIG. 6E may be defined as CAea, and has a smaller value than CAda that is the capacitance of FIG. 6D.

At this time, the fifth curvature 130e may be defined as having a negative polarity value. For example, the fifth curvature 130e may be defined as having a −4 level.

Meanwhile, according to FIGS. 6D and 6E, the liquid lens 28 operates as a concave lens, and accordingly, output light LP1c from which incident light LP1 is diverged is output.

FIG. 7 is an example of an internal block diagram of a camera module according to an embodiment.

Referring to the drawing, the camera module of FIG. 7 includes a lens curvature variation apparatus 800, an image sensor 820, an image processor 830, and a gyro sensor 815.

The lens curvature variation apparatus 800 includes a liquid lens 28, a lens driver 860, a pulse width variable controller 840, and a power supply unit 890.

Describing an operation of the lens curvature variation apparatus 800 of FIG. 7, when the pulse width variable controller 840 outputs a pulse width variable signal V in response to a target curvature or a target interface, the lens driver 860 may output a corresponding voltage to a plurality of individual electrodes and a common electrode of the liquid lens 28 by using the pulse width variable signal V and a voltage Vx of the power supply unit 890.

That is, the lens curvature variation apparatus 800 of FIG. 7 operates as an open loop system for varying the curvature of the liquid lens.

According to such a method, there is a disadvantage that the actual curvature of the liquid lens 28 may not be sensed in addition to outputting corresponding voltages to the plurality of individual electrodes and the common electrode of the liquid lens 28 in accordance with the target curvature.

In addition, according to the lens curvature variation apparatus 800 of FIG. 7, when the varying of the curvature of the liquid lens 28 is necessary to prevent a shake, the curvature is not sensed, and thus there is a disadvantage that accurate varying of the curvature may be difficult.

Accordingly, in this embodiment, as shown in FIG. 7, the lens curvature variation apparatus 800 is not implemented as the open loop system, but is implemented as a closed loop system.

That is, in order to grasp the curvature of the liquid lens 28, the lens curvature variation apparatus 800 senses a capacitance formed on the insulating layer on the electrode inside the liquid in the liquid lens 28 and the boundary region Ac0 in contact with the first liquid 122, feedbacks the sensed capacitance to calculate a difference between the target curvature and the present curvature, and performs a control according to the difference.

Accordingly, the curvature of the liquid lens 28 may be grasped quickly and accurately, and the curvature of the liquid lens 28 may be controlled quickly and accurately so as to correspond to the target curvature. This will be described in more detail with reference to FIG. 8 below.

FIG. 8 is an example of an internal block diagram of a camera module according to an embodiment.

Referring to the drawing, the camera module according to the embodiment may include a lens curvature variation apparatus 900, an image sensor 820 that converts light from a liquid lens 28 in the lens curvature variation apparatus 900 into an electric signal, and an image processor 930 that performs image processing based on the electric signal from the image sensor 820.

In particular, a camera module 100 of FIG. 8 may further include a gyro sensor 915.

The image processor 930 may output focus information (AF), and the gyro sensor 915 may output shake information (OIS).

Accordingly, a control unit 970 in the lens curvature variation apparatus 900 may determine a target curvature based on the focus information (AF) and the shake information (OIS).

Meanwhile, the lens curvature variation apparatus 900 according to the embodiment may include the lens driver 960 applying an electric signal to the liquid lens 28, a sensor unit 962 for sensing the curvature of the liquid lens 28 formed based on the electric signal, and the control unit 970 for controlling the lens driver 960 so as to form the target curvature of the liquid lens 28 based on the sensed curvature, wherein the sensor unit 962 may sense a size or change of an area of a boundary region Ac0 between an insulating layer on an electrode in the liquid lens 28 and a first liquid 122. Accordingly, the curvature of the lens may be sensed quickly and accurately.

Meanwhile, the lens curvature variation apparatus 900 according to the embodiment may include the liquid lens 28 of which curvature is variable based on the applied electric signal.

Meanwhile, the lens curvature variation apparatus 900 according to the embodiment may further include a power supply unit 990 and an AD converter 967.

Meanwhile, the lens curvature variation apparatus 900 may further include a plurality of conductive lines CA1 and CA2 for supplying an electric signal from the lens driver 960 to each electrode (common electrode, plurality of electrodes) in the liquid lens 28, and a switching element SWL disposed between any one conductive line CA2 of the plurality of conductive lines and the sensor unit 962.

In the drawing, it is illustrated that the switching element SWL is disposed between the conductive line CA2 for applying a pulse-shaped voltage (or electric signal) to any one of a plurality of individual electrodes in the liquid lens 28 and the sensor unit 962. In this case, a contact point between the conductive line CA2 and one end of the switching element SWL or the liquid lens 28 may be referred to as a node A. Meanwhile, in the embodiment as described above, a capacitance capable of sensing a size or change of the area of the boundary region Ac0 between the insulating layer on the electrode in the liquid lens 28 and the first liquid 122 is sensed for each of the plurality of individual electrodes.

Meanwhile, in the embodiment, in order to sense the curvature of the liquid lens 28, the pulse-shaped voltage (or electric signal) is applied to each electrode (common electrode, plurality of electrodes) in the liquid lens 28 via the plurality of conductive lines CA1 and CA2. Accordingly, the curvature may be formed at the interface 130 as shown in FIGS. 6A to 6E.

For example, the switching element SWL may be turned on during a first period.

At this time, when an electric signal is applied to the electrode in the liquid lens 28 in a state in which the switching element SWL is turned on and is electrically connected to the sensor unit 820, a curvature may be formed in the liquid lens 28, and an electric signal corresponding to the curvature formation may be supplied to the sensor unit 962 via the switching element SWL.

Accordingly, the sensor unit 962 may sense the size or change of the area of the boundary region Ac0 between the insulating layer 118 on the individual electrode in the liquid lens 28 and the first liquid 122, or the capacitance of the boundary region Ac0 based on the electrical signal from the liquid lens 28 during an ON period of the switching element SWL.

Then, the switching element SWL is turned off during a second period, and the electric signal may be continuously applied to the electrode in the liquid lens 28. Accordingly, a curvature may be formed in a liquid 530.

Then, during a third period, the switching element SWL is turned off, and no voltage may be applied to the electrode in the liquid lens 28, or a low level voltage may be applied thereto.

Then, during a fourth period, the switching element SWL may be turned on.

At this time, when a voltage is applied to the electrode in the liquid lens 28 in a state in which the switching element SWL is turned on and is electrically connected to the sensor unit 962, a curvature may be formed in the liquid lens 28, and an electric signal corresponding to the curvature formation may be supplied to the sensor unit 962 via the switching element SWL.

Meanwhile, when the curvature calculated based on the capacitance sensed during the first period is smaller than the target curvature, in order to reach the target curvature, the control unit 970 may control such that a pulse width of a pulse width variable control signal supplied to the lens driver 960 is increased.

Accordingly, a time difference between pulses applied to the common electrode 132 and the plurality of individual electrodes respectively may be increased, and thus the curvature formed in the interface 130 may be increased.

During the fourth period, when an electric signal is applied to the electrode in the liquid lens 28 in a state in which the switching element SWL is turned on and is electrically connected to the sensor unit 962, a curvature may be formed in the liquid lens 28, and an electric signal corresponding to the curvature formation may be supplied to the sensor unit 962 via the switching element SWL.

Accordingly, the sensor unit 962 may sense the size or change of the area of the boundary region Ac0 between the insulating layer on the individual electrode in the liquid lens 28 and the first liquid 122, or the capacitance of the boundary region Ac0 based on the electrical signal from the liquid lens 28 during an ON period of the switching element SWL.

Accordingly, the control unit 970 may calculate the curvature based on the sensed capacitance, and may determine whether the curvature reaches the target curvature. Meanwhile, when the curvature reaches the target curvature, the control unit 970 may control a corresponding voltage to be supplied to the individual electrode and the common electrode.

Accordingly, it is possible to form the curvature of the interface 130 according to the supplied voltage, and to sense directly the curvature of the formed interface. Therefore, it is possible to grasp the curvature of the liquid lens 28 quickly and accurately.

Meanwhile, in the drawing, the lens driver 960 and a sensor driver (not shown) may be formed as a single module.

Meanwhile, in the drawing, the lens driver 960, the sensor unit 962, the control unit 970, the power supply unit 990, the AD converter 967, and the switching element SWL may be implemented in a single chip as a system on chip (SOC) 905.

Meanwhile, as described in FIGS. 5A and 5B, the liquid lens 28 may include the common electrode COM (132), the second liquid 124 on the common electrode COM (132), the first liquid 122 on the second liquid 124, and the plurality of individual electrodes LA to LD (134a to 134d) disposed to be spaced apart from the first liquid 122.

Meanwhile, as described in FIGS. 6A to 6E, the sensor unit 962 may sense the area of the boundary region Ac0 between the insulating layer on the individual electrode in the liquid lens 28 and the first liquid 122, the change of the area, or the capacitance corresponding thereto.

Meanwhile, an analog signal related to the capacitance sensed by the sensor unit 962 may be converted into a digital signal via the AD converter 967 to input to the control unit 970.

Meanwhile, as described in FIGS. 6A to 6E, as the curvature of the liquid lens 28 is increased, the area of the boundary region Ac0 is increased, and finally the capacitance of the boundary region Ac0 is increased.

In the embodiment, such characteristics are used to calculate the curvature by using the capacitance sensed at the sensor unit 962.

Meanwhile, the control unit 970 may control a level of the voltage applied to the liquid lens 28 to be increased, or may control the pulse width to be increased, in order to increase the curvature of the liquid lens 28.

Meanwhile, as shown in FIG. 6C, when a voltage of a different level or a voltage of a different pulse width is applied to the first individual electrode 134a and the second individual electrode 134b among the plurality of individual electrodes LA to LD (134a to 134d), a first capacitance of a first region Aca of the interface 130 and a second capacitance of a second region Acb of the interface 130 are changed.

Accordingly, the sensor unit 962 may sense the capacitance of each of the first region Aca and the second region Acb of the interface 130. To this end, the sensor unit 962 is connected to the plurality of individual electrodes LA to LD (134a to 134d), respectively, and accordingly, the capacitance of the boundary region between the insulating layer on each individual electrode and the first liquid 122 may be sensed individually.

As described above, it is possible to sense accurately the curvature of the liquid lens by sensing the capacitance of the boundary region of the interface 130 in the liquid lens 28.

That is, it is possible to sense accurately the curvature of the liquid lens by sensing the capacitance of a plurality of boundary regions between the insulating layer on the electrode in the liquid lens 28 and the first liquid 122.

Meanwhile, the control unit 970 may calculate the curvature of the liquid lens 28 based on the capacitance sensed at the sensor unit 962.

At this time, the control unit 970 may calculate that as the capacitance sensed at the sensor unit 962 is increased, the curvature of the liquid lens 28 is increased.

In addition, the control unit 970 may control the liquid lens 28 so as to have a target curvature.

Meanwhile, the control unit 970 may calculate the curvature of the liquid lens 28 based on the capacitance sensed at the sensor unit 962, and may output a pulse width variable signal V to the lens driver 960 based on the calculated curvature and the target curvature.

Accordingly, the lens driver 960 may output a corresponding voltage to the plurality of individual electrodes of the plurality of individual electrodes LA to LD (134a to 134d) and the common electrode 132 by using the pulse width variable signal V and voltages Lv1 and Lv2 of the power supply unit 990.

As described above, it is possible to vary the curvature of the lens quickly and accurately by sensing the capacitance of the liquid lens 28 and feeding it back, and applying an electric signal to the liquid lens 28 so that the curvature of the lens is varied.

Meanwhile, the control unit 970 may include an equalizer 972 calculating a curvature error $\phi$ based on the calculated curvature and the target curvature, and a pulse width variable controller 940 that generates and outputs the pulse width variable signal V based on the calculated curvature error $\phi$.

Accordingly, when the calculated curvature becomes larger than the target curvature, the control unit 970 may control so that a duty of the pulse width variable signal V is increased based on the calculated curvature error ϕ. Accordingly, it is possible to vary the curvature of the liquid lens 28 quickly and accurately.

Meanwhile, the control unit 970 may receive the focus information (AF) from the image processor 930 and the shake information (OIS) from the gyro sensor 915, and may determine the target curvature based on the focus information (AF) and the shake information (AF).

At this time, an update cycle of the determined target curvature is preferably longer than that of the calculated curvature based on the sensed capacitance of the liquid lens 28.

As a result, since the update cycle of the calculated curvature is smaller than that of the target curvature, it is possible to quickly vary the curvature of the liquid lens 28 to change it to a desired curvature.

FIG. 9 is a diagram showing a change curve of the curvature of the liquid lens at the lens curvature variation apparatus of FIGS. 7 and 8.

Referring to the drawings, GRo shows the change curve of the curvature of the liquid lens 28 at the lens curvature variation apparatus 800 of FIG. 7, and GRc shows the change curve of the curvature of the liquid lens 28 at the lens curvature variation apparatus 900 of FIG. 8.

In particular, it is illustrated that a voltage for a change toward a target curvature is applied to the liquid lens 28 at a time Tx, respectively, and application of a voltage is stopped at a time Ty.

Comparing the two curves, in case of the lens curvature variation apparatus 800 of FIG. 7 of the open loop system, it may be seen that it is slowly settling to a target diopter, but not exactly, whereas in case of the lens curvature variation apparatus 900 of FIG. 8. of the closed loop system, it may be seen that it is quickly and accurately settling to the target diopter.

Compared to the lens curvature variation apparatus 800 of FIG. 7 of the open loop system, a settling timing may be about 70% faster in the case of the lens curvature variation apparatus 900 of FIG. 8. of the closed loop system.

As a result, when using the lens curvature variation apparatus 900 of FIG. 8 of the closed loop system, it is possible to form the curvature and the diopter quickly and accurately.

Meanwhile, the diopter may correspond to the curvature of the interface 130 described in FIGS. 6A to 6E. Accordingly, it is possible to define that as the curvature of the interface 130 increases, the diopter increases, and as the curvature decreases, the diopter decreases.

For example, as shown in FIGS. 6A to 6B, when the curvature has levels of +2 and +4, the diopter may be defined as having the levels of +2 and +4 corresponding to a convex lens, as shown in FIG. 6B, when the curvature is at 0 level, the diopter may be defined as having 0 level corresponding to a planar lens, and as shown in FIGS. 6D to 6E, when the curvature has levels of −2 and −4, the diopter may be defined as having the levels of −2 and −4 corresponding to a concave lens.

FIG. 10 is an example of an internal circuit diagram of the lens driver in FIG. 8.

Referring to the drawing, a lens driver 960a of FIG. 10 may include a first driver 961 driving a lens and a second driver 1310 driving a sensor. Here, the first driver 961 may also be referred to as a driving voltage driver. In addition, the second driver 1310 may also be referred to as a sensing voltage driver.

Meanwhile, the lens driver 960a may further include a pulse width variable controller 1320 that outputs a pulse width variable signal to the second driver 1310.

Meanwhile, the pulse width variable controller 1320 may also be included in the pulse width variable controller 940 of FIG. 8.

The first driver 961 may include first upper-arm and lower-arm switching elements Sa and S'a connected in series with each other, and second upper-arm and lower-arm switching elements Sb and S'b connected in series with each other.

At this time, the first upper-arm and lower-arm switching elements Sa and S'a and the second upper-arm and lower-arm switching elements Sb and S'b are connected in parallel with each other.

Electric power of a second level LV2 from a first power supply unit 990a may be supplied to the first upper-arm switching element Sa and the second upper-arm switching element Sb.

The second driver 1310 may include third upper-arm and lower-arm switching elements Sc and S'c connected in series with each other.

Electric power of a first level LV1 lower than the second level LV2 from a second power supply unit 990b may be supplied to the third upper-arm switching element Sc in order to generate an additional pulse of a low level (which may also be referred to as a sensing pulse). The second power supply unit 990b may also be referred to as a sensing voltage supply unit.

The first level LV1 may be determined based on the second level LV2. For example, the first level LV1 may be greater than 3% of the second level LV2. For example, the first level LV1 may be smaller than 20% of the second level LV2. For example, when the second level LV2 is 70V, the first level LV1 may be a voltage between 2.1V and 21V. At this time, when the first level LV1 is smaller than 3% of the second level LV2, a charge amount accumulated by the sensing pulse is too small, and thus it may be difficult to accurately measure the curvature of the interface 130. In addition, when the first level LV1 is greater than 20% of the second level LV2, a voltage of the sensing pulse affects a driving voltage of the liquid lens 28, and accordingly, the driving voltage of the liquid lens 28 may be different from the target voltage, and thus the interface of the liquid lens 28 may be largely departed from the target curvature. Therefore, in an embodiment, the first level LV1 may be between 3% and 20% of the second level LV2.

The second power supply unit 990b converts intensity of an input voltage into a voltage within the above-described range and outputs it to the second driver 1310. At this time, the input voltage may be supplied from a battery (not shown). For example, the input voltage may be a voltage of a battery in a mobile terminal to which the camera module of the embodiment is applied. For example, the input voltage may be 12V, but the embodiment is not limited thereto.

Meanwhile, a voltage may be applied to the common electrode 132 via a node between the first upper-arm switching element Sa and the first lower-arm switching element S'a or a node between the third upper-arm switching element Sc and the third lower-arm switching element S'c, and a voltage may be applied to the first electrode LA (134a) via a node between the second upper-arm switching element Sb and the second lower-arm switching element S'b.

At this time, in the embodiment, a capacitance corresponding to the curvature of the interface 130 may be sensed by using a sensing pulse supplied via the second driver 1310. Meanwhile, the sensing pulse may be supplied at a specific timing. For example, the sensing pulse may be supplied at a time at which a voltage is not supplied to the common electrode COM and the plurality of individual electrodes LA to LD. For example, the sensing pulse may be supplied at a time at which all the first upper-arm and lower-arm switching elements Sa and S'a and the second upper-arm and lower-arm switching elements Sb and S'b constituting the first driver 961 operate in an open state. That is, a ground of the sensor unit 962, a ground of the first driver 961, and a ground of the power supply unit 990 are all connected. At this time, when a switching operation of the switching element included in the first driver 961 or the power supply unit 990 is performed during an operation of the sensor unit 962, thereby noise is generated in the ground. Also, the sensor unit 962 may have difficulty in accurate sensing of capacitance due to the generated noise. Therefore, the sensing pulse in the embodiment may be supplied at a time at which the switching element of the first driver 961 or the power supply unit 990 does not perform the switching operation, for example, in a period of a state in which all the switching elements are opened. It will be described in more detail below.

FIG. 11 is a modified example of the lens driver in FIG. 10.

Referring to the drawing, a lens driver 960b of FIG. 11 may include a first driver 961 driving a lens and a second driver 1310 driving a sensor.

Meanwhile, the lens driver 960b may further include a pulse width variable controller 1320 that outputs a pulse width variable signal to the second driver 1310. Meanwhile, the pulse width variable controller 1320 may be included in the pulse width variable controller 940 of FIG. 8.

The first driver 961 may include first upper-arm and lower-arm switching elements Sa and S'a connected in series with each other, and second upper-arm and lower-arm switching elements Sb and S'b connected in series with each other.

At this time, the first upper-arm and lower-arm switching elements Sa and S'a and the second upper-arm and lower-arm switching elements Sb and S'b are connected in parallel with each other.

Electric power of a second level LV2 from a first power supply unit 990 may be supplied to the first upper-arm switching element Sa and the second upper-arm switching element Sb.

Meanwhile, the second driver 1310 in FIG. 10 had a half-bridge structure including the third upper-arm and lower-arm switching elements Sc and S'c connected in series with each other.

Alternatively, the second driver 1310 in FIG. 11 may include a single switching element, and accordingly, a sensing pulse may be provided to a common electrode COM by using a voltage supplied from a second power supply unit 990b in an ON period, and an output of the sensing pulse to the common electrode COM may be blocked in an OFF period.

To this end, the second driver 1310 may include only the third upper-arm switching element Sc, which may provide the sensing pulse to the common electrode COM.

FIG. 12 is another modified example of the lens driver in FIG. 10.

Referring to the drawing, a lens driver 960c of FIG. 12 may include a first driver 961 driving a lens and a second driver 1310 driving a sensor.

Meanwhile, the lens driver 960c may further include a pulse width variable controller 1320 that outputs a pulse width variable signal to the second driver 1310. Meanwhile, the pulse width variable controller 1320 may be included in the pulse width variable controller 940 of FIG. 8.

The first driver 961 may include first upper-arm and lower-arm switching elements Sa and S'a connected in series with each other, and second upper-arm and lower-arm switching elements Sb and S'b connected in series with each other.

At this time, the first upper-arm and lower-arm switching elements Sa and S'a and the second upper-arm and lower-arm switching elements Sb and S'b are connected in parallel with each other.

Electric power of a second level LV2 from a first power supply unit 990 may be supplied to the first upper-arm switching element Sa and the second upper-arm switching element Sb.

The second driver 1310 may include a single switching element, and accordingly, a sensing pulse may be provided to a common electrode COM by using a voltage supplied from a second power supply unit 990b in an ON period, and an output of the sensing pulse to the common electrode COM may be blocked in an OFF period.

To this end, the second driver 1310 may include only the third upper-arm switching element Sc, which may provide the sensing pulse to the common electrode COM.

Meanwhile, the power supply unit 990 of FIG. 12 may include only a first power supply unit 990a. That is, the second power supply unit 990b in FIGS. 10 and 11 may be omitted. Accordingly, the second driver 1310 may generate the sensing pulse by an input power Vin, and may provide the sensing pulse to the common electrode COM. At this time, the input power Vin may be a battery power. For example, the input power Vin may be 12V. Therefore, the first level LV1 of the sensing pulse may be 12V.

At this time, the input power Vin is also supplied to the first power supply unit 990a. That is, the first power supply unit 990a is a booster converter or a voltage booster that boosts the input power Vin, and accordingly, it is possible to convert into a voltage of the second level LV2 by boosting a voltage strength of the input power Vin. In addition, the second driver 1310 may output the input power Vin as it is through a control of the switching element without a conversion process to supply the sensing pulse.

Hereinafter, an output timing of the sensing pulse and an operation of the sensor unit 962 thereto will be described.

FIG. 13A is an example of a waveform diagram for describing an operation of the lens driver 960a of FIG. 10, and FIG. 13B is a view referred to for describing an operation of the sensor unit of FIG. 10.

A first cycle of the waveform diagram from FIG. 13A refers to from a time T1 to a time T7. The time T7 may refer to an end time of the first cycle, and may also refer to a start time of a second cycle after the first cycle.

In the embodiment, the sensing pulse SMP is applied during a part of the period between the time T1 and the time T7 corresponding to the first cycle, and the capacitance of the charge accumulated by the applied sensing pulse SMP is sensed so as to trace the curvature of the interface 130.

First, a high-level control signal CMHP is applied to the Sa switching element at the time T1 which is a start time of the first cycle, and a high-level control signal LAP is applied to the Sb switching element at a time T2.

Meanwhile, a low-level control signal CMHP may be applied to the Sa switching element at a time T3, and at this time, a high-level control signal CMHM is applied to the S'a switching element.

In addition, a low-level control signal LAP may be applied to the Sb switching element at a time T4, and at this time, a high-level control signal LAM may be applied to the S'b switching element.

At this time, the Sb switching element and the S'b switching element may be turned on complementarily, but all of them are floated during a period in which the switching element SWL is turned on.

Meanwhile, in the embodiment, the second driver 1310 may be driven during a period in which low-level control signals CMHP and LAP are applied to both the Sa switching element and the Sb switching element.

That is, in the embodiment, the sensing pulse SMP may be applied during a period between a time T4 and the time T7. That is, in the period between the time T4 and the time T7, both the common electrode COM and the first individual electrode LA are connected to the ground. At this time, no voltage is supplied to the common electrode COM and the first individual electrode LA. It refers that the switching state of the first driver 961 is not changed in the period between the time T4 and the time T7. Therefore, in the embodiment, in order to minimize noise according to the switching operation that occurs during sensing operation of the capacitance, the sensing pulse SMP may be applied in the period between the time T4 and the time T7 as described above, and the capacitance of the charge accumulated between the common electrode COM and the individual electrodes LA to LD by the sensing pulse SMP may be sensed.

In the embodiment, the sensing pulse SMP is supplied during a part of the period from the time T4 to the time T7.

To this end, in the embodiment, the second driver 1310 is driven at a time T5 so that the sensing pulse SMP is supplied. At this time, the low-level control signal CMHM may be supplied to the S'a switching element at the time T5. In addition, a high-level control signal CMLP may be supplied to a Sc switching element at the time T5, and accordingly, the sensing pulse SMP having a first level LV1 may be supplied to the common electrode COM. Further, a low-level control signal CMLP may be supplied to the Sc switching element at the time T7, which is a predetermined time before the time T7 at which the first cycle ends.

Therefore, the sensing pulse SMP may be supplied to the common electrode COM during a period between the time T5 and a time T6.

Meanwhile, the switching element SWL of the sensor unit 962 may be turned on during the period between the time T5 and the time T6 at which the second driver 1310 operates. In addition, the charge accumulated by the sensing pulse SMP is provided to the sensor unit 962 by turning on the switching element SWL, and accordingly, the sensing operation of the capacitance may be performed.

At this time, a time at which the sensing operation of the capacitance by the sensor unit 962 is completed may be later than the time T6 at which the supply of the sensing pulse SMP is stopped. That is, the sensing operation by the sensor unit 962 may not be completed during a period in which the sensing pulse SMP is supplied. Therefore, the switching element SWL of the sensor unit 962 may be turned off at a time later than the time T6 and earlier than the time T7.

Accordingly, the sensor unit 962 may sense a capacitance corresponding to a size or change of an area of a boundary region Ac0 between the insulating layer on the individual electrode in the liquid lens 28 and the first liquid 122 during a period Dt1 between the time T5 and the time T6 at which the switching element SWL is turned on.

Specifically, a voltage SLP having a pulse width of Dt2 and a second level greater than the first level may be applied to the common electrode COM at the time T1.

Then, a voltage having a pulse width of Dt3 may be applied to the first individual electrode LA at the time T2.

At this time, the curvature formed at the interface 130 in the liquid lens 28 may be varied by a time difference DFF1 between the voltage applied to the common electrode COM and the voltage applied to the first individual electrode LA.

For example, as the time difference DFF1 of the voltage is smaller, the size of the area of the boundary region Ac0 between the electrode and the first liquid 122 may be increased, and accordingly, the capacitance may be increased, and consequently, the curvature may be decreased.

Meanwhile, as described above, the period in which the sensing pulse SMP is supplied may be set in a period in which a voltage is not applied to the common electrode COM and the individual electrodes LA to LD. At this time, voltages having different time differences may be applied to the plurality of individual electrodes LA to LD with reference to the voltage applied to the common electrode COM.

Accordingly, in the embodiment, a voltage having a largest time difference as compared with the voltage applied to the common electrode COM among the voltages applied to the individual electrodes LA to LD is set as a reference. For example, when the voltage applied to the first individual electrode LA among the plurality of individual electrodes LA to LD has the greatest time difference as compared with the voltage applied to the common electrode COM, a period between the time at which the voltage is not supplied to the first individual electrode LA and the time at which the first cycle ends is determined as the period in which the sensing pulse SMP is supplied.

In addition, the maximum value of the driving voltage that may be supplied to the liquid lens 28 is decreased during the period in which the sensing pulse SMP is supplied. That is, the driving voltage of the liquid lens 28 increases as the time difference between the voltage applied to the common electrode COM and the voltage applied to the individual electrodes LA to LD increases. At this time, the voltage is not supplied to the individual electrodes LA to LD during the period in which the sensing pulse SMP is supplied, and as a result, the voltage supplied to the individual electrodes LA to LD may not be delayed as compared with the voltage supplied to the common electrode COM during the period in which the sensing pulse SMP is supplied. Therefore, when the period in which the sensing pulse SMP is supplied is too large, the maximum value of the driving voltage that may be supplied to the liquid lens 28 is decreased, and when the period in which the sensing pulse SMP is supplied is too small, the sensing operation of the capacitance may not be performed normally. Accordingly, in the embodiment, an optimal supply period of the sensing pulse SMP that may solve the above problems is set.

For the reasons described above, the sensing pulse SMP is separated from the end time of the first cycle by a predetermined time, and is generated in a period as close as possible to the end time of the first cycle. At this time, the period in which the sensing pulse SMP is generated is set to be 1% or more as compared with the period of the first cycle. That is, when the period in which the sensing pulse SMP is generated is less than 1% of the entire period of the first cycle, a charge amount accumulated by the sensing pulse SMP is small, and thus accurate sensing of the capacitance may not be performed. In addition, that is, when the period in which the sensing pulse SMP is generated is less than 1% of the entire period of the first cycle, sufficient time required to sense the capacitance at the sensor unit 962 is not secured, and thus accurate sensing of the capacitance may not be performed. At this time, the period in which the sensing pulse SMP is generated is set to be 10% or less compared to the entire period of the first cycle. That is, when the period in which the sensing pulse SMP is generated exceeds 10% of the entire period of the first cycle, the maximum driving voltage that may be supplied to the liquid lens 28 decreases, and accordingly, the interface of the liquid lens 28 may not be formed to have a desired curvature. Preferably, the period in which the sensing pulse SMP is generated is set to have a range between 3% and 6% of the entire period of the first cycle. More preferably, the period in which the sensing pulse SMP is generated is set to be 5% of the entire period of the first cycle.

Hereinafter, an operation of the sensor unit 962 at the time at which the switching element SWL of the sensor unit 962 is turned on according to generation of the sensing pulse SMP will be described.

FIG. 14 shows an example of a circuit constituting a sensor unit. FIG. 15 shows one example of a lens driver.

A sensor unit 962 illustrated in FIGS. 14 and 15 presents one example of a capacitance measuring circuit for measuring a capacitance, and may include various components according to an embodiment.

As shown in the drawings, when the sensing pulse SMP supplied from the second driver 1310 is applied to the common electrode COM disposed in the liquid lens, the sensor unit 962 connected to any one individual electrode LA among the plurality of individual electrodes LA to LD may measure a capacitance between the two electrodes LA and COM to recognize a state of the interface 130.

When the sensing pulse SMP is applied, and accordingly, the switching element SWL of the sensor unit 962 is turned on, an amount of a charge Q accumulated by the sensing pulse SMP may be equal to an amount of change in voltage multiplied by a capacitance C of the interface 130. At this time, when the switching element SWL of the sensor unit 962 is turned on, the accumulated charge Q may move to a reference capacitor Cap-m.

Thereafter, when the switching element SWL is turned off and a reference switching element SWR is turned on at a falling edge at which the supply of the sensing pulse SMP is stopped, a charge transferred to the reference capacitor Cap-m may move to an on-chip capacitor Cap-on. At this time, an amount of the charge Q moving to the on-chip capacitor Cap-on may be equal to an amount of change in voltage multiplied by a capacitance of the on-chip capacitor Cap-on.

A ratio of a number of couplings by the capacitance C of the interface 30 and a number of couplings by the on-chip capacitor Cap-on is adjusted so that the total amount of charges accumulated in the reference capacitor (Cap-m) is 0, and a ratio of the two capacitances is calculated from the ratio. Since the capacitance of the on-chip capacitor Cap-on is a known value, a capacitance of the capacitance C of the interface 130 may be measured.

The above-described configuration of the sensor unit 962 may be changed depending on an embodiment, and an operation and control method may differ according thereto. Here, the sensor unit 962 may be designed so as to measure a change of several pF to 200 pF.

A configuration of a circuit for measuring the capacitance may be variously implemented depending on an embodiment. For example, a circuit that calculates the capacitance based on a resonance frequency by using LC series resonance may be used at the individual electrodes LA to LD. However, when LC series resonance is used, it may take time to calculate the capacitance because it is necessary to apply a waveform for each frequency in order to search for the resonance frequency, and accordingly, the interface of the liquid lens may be affected. However, the sensor unit 962 described above is a capacitance measuring circuit using a switched capacitor. The switched capacitor may include two switches and one capacitor, and is a device that controls an average current flowing using them, and an average resistance may be inversely proportional to a capacitance of the capacitor and an operating frequency of the switch. When the capacitance of the liquid lens is measured using the switched capacitor, the capacitance may be measured at a very fast speed (e.g., several tens of ns).

In addition, as a circuit for measuring a capacitance, a switched capacitor circuit that may be configured with only capacitors and switches has a high degree of integration than an LC series resonance circuit that should include all resistors, inductors, and capacitors, and thus it may be easily applied to a mobile device and the like. One end of the switching element SWL may be electrically connected to the liquid lens and the lens driver 960.

Hereinafter, with reference to FIG. 15, for convenience of description, one LA of a plurality of individual electrodes will be described as an example.

As shown in the drawing, the second driver 1310 may include the lens driver 960 and the sensor unit 962, and may be connected to the liquid lens 28. The first driver 961 may selectively supply the voltage of the second level LV2 or a ground voltage GND to the individual electrode LA and the common electrode COM included in the liquid lens 28.

The sensor unit 962 may be connected to the individual electrode LA. When the sensor unit 962 turns on the switching element SWL described later in order to measure the capacitance of the liquid lens 28, the charge amount accumulated by the sensing pulse SMP may be transferred to the sensor unit 962. The sensor unit 962 may further include components such as a capacitor in addition to a comparator, and thus it is possible to measure the charge amount transferred from the liquid lens 28.

The switching element SWL may be disposed between the sensor unit 962 and the individual electrode LA.

At this time, the ground voltage GND is applied to the individual electrode LA before measuring the capacitance of the liquid lens 28. Thereafter, when the switching element SWL is turned on (ON), the S'b switching element of the first driver 961 is turned off (OFF) so that the individual electrode LA is in a floating state. The S'b switching element is a switch for applying the ground voltage GND to the individual electrode LA. Thereafter, when the switching element SWL is connected and the sensing pulse SMP is applied to the common electrode COM to be measured, the charge may be accumulated by the sensing pulse SMP, and the accumulated charge may be moved to the sensor unit 962.

FIG. 16 is another view referred to for describing an operation of a sensor unit.

FIG. 16 is similar to the operation description of FIG. 13B, but in a period in which a sensing pulse SMP is supplied, there is a difference in that the control signal CMLP for the operation of the switching element Sc has a plurality of pulses instead of a single pulse. That is, in FIG. 13B, one sensing pulse SMP is generated within the corresponding period, but in FIG. 16, a plurality of sensing pulses SMPa may be applied within the corresponding period.

That is, as shown in FIG. 16, the plurality of sensing pulses SMPa are applied to the common electrode COM during a period from a time T5 to a time T6.

Accordingly, the sensor unit 962 may sense a capacitance corresponding to a size or change of the area of the boundary region Ac0 between the insulating layer on the individual electrode in the liquid lens 28 and the first liquid 122 during a period Dt1 between the time T5 and the time T6.

Specifically, during the period from the time T5 and the time T6, a plurality of pulse signals are applied to the common electrode COM, and accordingly a charge may be accumulated between the common electrode COM and the individual electrode LA. In addition, the accumulated charges may be moved to the sensor unit 962 by turning on the switching element SWL. Further, the sensor unit 962 may measure a capacitance corresponding to the moving charge to sense the curvature of the interface 130 corresponding thereto.

FIG. 17 is one example of an internal block diagram of a camera module according to another embodiment of the present invention.

Referring to the drawing, a lens curvature variation apparatus of FIG. 17 is similar to the camera module and lens curvature variation apparatus of FIG. 8, but there is a difference in that a sensor unit 962 senses capacitances of ends of a plurality of interfaces 130 corresponding to a plurality of individual electrodes LA to LD (134*a* to 134*d*), respectively.

To this end, a sensing pulse SMP is applied to the common electrode COM 132, and based on this, a capacitance accumulated by the applied sensing pulse SMP may be sensed at the plurality of individual electrodes LA to LD (134*a* to 134*d*).

Meanwhile, for an operation of the sensor unit 9620, it is preferable that a plurality of switching elements SWLa to SWLd are included between conductive lines CA to CD that are connected between the plurality of individual electrodes LA to LD (134*a* to 134*d*) and the liquid lens 28 and the sensor unit 962.

The sensor unit 962 may sense the capacitance of the boundary region between the insulating layer on the plurality of individual electrodes LA to LD (134*a* to 134*d*) and the first liquid 122 during a period in which the plurality of switching elements SWLa to SWLd are turned on, based on the sensing pulse SMP applied to the common electrode COM, and may transmit it to the control unit 970.

Accordingly, it is possible to sense the capacitance of a plurality of boundary regions of the liquid lens 28.

Further, in the camera module of FIG. 17, an asymmetric curvature may be formed by varying the voltage applied to the plurality of individual electrodes LA to LD (134*a* to 134*d*) in response to camera shake correction, and thus the camera shake correction may be performed quickly and accurately.

Meanwhile, the lens curvature variation apparatus 900 described in FIGS. 8 to 17 may be adopted in various electronic devices such as mobile terminals.

FIG. 18 is one example of an internal block diagram of a camera module according to still another embodiment of the present invention.

Referring to the drawing, a camera module and a lens curvature variation apparatus of FIG. 18 is similar to the camera module and lens curvature variation apparatus of FIG. 8, but there is a difference in that a sensor unit 962 senses capacitances of ends of the interfaces 130 corresponding to a plurality of electrodes LA to LD (134*a* to 134*d*). That is, FIG. 18 shows that the sensor unit 962 is connected to the common electrode COM instead of being connected to the individual electrodes LA to LD as in the previous embodiment.

To this end, a sensing pulse SMP is applied to the plurality of individual electrodes LA to LD (134*a* to 134*d*).

Meanwhile, for an operation of the sensor unit 962, it is preferable that a switching element SWL is included between a conductive line CM and the sensor unit 962 that are connected between the common electrode COM and the liquid lens 28 instead of the conductive lines CA to CD that are connected between the plurality of individual electrodes LA to LD (134*a* to 134*d*) and the liquid lens 28.

The sensor unit 962 may sense the capacitance of the boundary region between the insulating layer on the electrode and the first liquid 122 during a period in which the switching element SWL is turned on, based on the sensing pulse SMP applied to the individual electrodes LA to LD, and may transmit it to the control unit 970.

Accordingly, it is possible to sense the capacitance of a boundary region of the liquid lens 28.

To this end, the second driver 1310 may be connected to the plurality of individual electrodes LA to LD (134*a* to 134*d*), respectively, and may supply the sensing pulse to the plurality of individual electrodes LA to LD (134*a* to 134*d*), respectively.

At this time, the sensing pulses respectively supplied to the plurality of individual electrodes LA to LD (134*a* to 134*d*) may be supplied so as not to be overlapped with each other within the same cycle. That is, when the sensing pulses supplied to the plurality of individual electrodes LA to LD (134*a* to 134*d*) are supplied at the same time, it is difficult to measure accurately the capacitance corresponding to each individual electrode at the sensor unit, and accordingly, the sensing pulses supplied to the plurality of individual electrodes LA to LD (134*a* to 134*d*) may be supplied so as not to be overlapped with each other within the same cycle.

Alternatively, the plurality of individual electrodes LA to LD (134*a* to 134*d*) may be sequentially supplied with sensing pulses within different cycles. For example, in a first cycle, the sensing pulse may be supplied to a first individual electrode to sense the capacitance formed between the common electrode and the first individual electrode. In addition, in a second cycle after the first cycle, the sensing pulse may be supplied to a second individual electrode to sense the capacitance formed between the common electrode and the second individual electrode. Further, in a third cycle after the second cycle, the sensing pulse may be supplied to a third individual electrode to sense the capacitance formed between the common electrode and the third individual electrode. Furthermore, in a fourth cycle after the third cycle, the sensing pulse may be supplied to a fourth individual electrode to detect the capacitance formed between the common electrode and the fourth individual electrode.

Meanwhile, alternatively, the sensing pulses respectively supplied to the plurality of individual electrodes LA to LD (134*a* to 134*d*) may overlap at least partially within the same cycle. Accordingly, the sensor unit may sense the entire capacitance formed between the plurality of individual electrodes LA to LD (134*a* to 134*d*) and the common electrode COM.

FIG. 19 is a diagram showing a lens driver according to another embodiment of the present invention.

Referring to the drawings, the lens driver of FIG. 19 is similar to the lens driver of FIG. 12, but there is a difference in that a second driver 1310 includes a Sc switching element connected to the common electrode COM and a Sd switching element connected to the individual electrodes LA to LD. That is, FIG. 19 shows that the second driver 1310 not only generates a pulse of a first level only for the common electrode COM, but also generates a pulse for the individual electrodes LA to LD so as to correspond to the pulse supplied to the common electrode COM.

Referring to the drawing, a lens driver 960d of FIG. 19 may include a first driver 961 driving a lens and a second driver 1310 driving a sensor.

Meanwhile, the lens driver 960d may further include a pulse width variable controller 1320 that outputs a pulse width variable signal to the second driver 1310. Meanwhile, the pulse width variable controller 1320 may be included in the pulse width variable controller 940 of FIG. 8.

The first driver 961 may include first upper-arm and lower-arm switching elements Sa and S'a connected in series with each other, and second upper-arm and lower-arm switching elements Sb and S'b connected in series with each other.

At this time, the first upper-arm and lower-arm switching elements Sa and S'a and the second upper-arm and lower-arm switching elements Sb and S'b are connected in parallel with each other.

Electric power of a second level LV2 from the first power supply unit 990a may be supplied to the first upper-arm switching element Sa and the second upper-arm switching element Sb.

The second driver 1310 may include a third upper-arm switching element Sc and a fourth upper-arm switching element Sd for generating pulses on the common electrode COM and the individual electrodes LA to LD, respectively.

The third upper-arm switching element Sc supplies a sensing pulse SMP for sensing the curvature of the interface 130 to the common electrode COM.

The fourth upper-arm switching element Sd prevents the curvature of the liquid lens 28 from changing due to the sensing pulse SMP supplied to the individual electrodes LA to LD.

That is, in the previous embodiment, the sensing pulse SMP was supplied only to any one of the common electrode COM and the individual electrodes LA to LD.

At this time, the liquid lens 28 should be controlled based on a voltage of an AC component, but applying the pulse to only one electrode as described above may be the same as applying a voltage of a DC component to the liquid lens 28. Here, the first level of the pulse belongs to a range of 3% to 20% as compared with the second level corresponding to the driving voltage of the liquid lens, and thus it does not significantly affect the curvature of the liquid lens 28. However, when the pulse is periodically supplied continuously, the common electrode COM to which the sensing pulse SMP is applied is driven by offsetting the voltage corresponding to the first level of the sensing pulse SMP instead of 0V, and thus it difficult to form an accurate target curvature of the lens. Therefore, in the embodiment, an offset pulse SMP' having the same magnitude as the sensing pulse SMP is supplied to not only the common electrode COM but also the individual electrodes LA to LD to set the offset to zero. In other words, in the embodiment, the sensing pulse SMP is supplied to the common electrode COM, and the offset pulse SMP' having the same level as the sensing pulse SMP is provided to the individual electrodes LA to LD so as to remove the voltage of the DC component. In other words, in the embodiment, the sensing pulse SMP is supplied to the common electrode COM, and the offset pulse SMP' having the same level as the sensing pulse SMP is provided to the individual electrodes LA to LD, and accordingly, it enables the sensing pulse SMP to be offset. At this time, the operation of the sensor unit 962 may be the same as that of the previous embodiment.

FIG. 20 is a view referred to for describing an operation of the sensor unit of FIG. 19.

A first cycle of a waveform diagram from FIG. 20 refers to from a time T1 to a time T7. The time T7 may refer to an end time of the first cycle, and may also refer to a start time of a second cycle after the first cycle.

In an embodiment, the sensing pulse SMP is applied to the common electrode COM during a part of a period between the time T1 and the time T7 corresponding to the first cycle, and the capacitance of the charge accumulated by the applied sensing pulse SMP is sensed so as to trace the curvature of the interface 130. At this time, the offset pulse SMP' corresponding to the sensing pulse SMP is also provided to the individual electrodes LA to LD so as to offset the sensing pulse SMP.

In the embodiment, the second driver 1310 may be driven during a period in which low-level control signals CMHP and LAP are applied to both the Sa switching element and the Sb switching element.

That is, in the embodiment, the sensing pulse SMP and the offset pulse SMP' may be applied during a period between a time T4 and the time T7. At this time, it is shown in the drawing that the offset pulse SMP' is supplied before the sensing pulse SMP, but it is merely one example, and the sensing pulse SMP may be supplied before the offset pulse SMP' is supplied.

That is, in the period between the time T4 and the time T7, both the common electrode COM and the first individual electrode LA are connected to the ground. At this time, no voltage is supplied to the common electrode COM and the first individual electrode LA. It refers that the switching state of the first driver 961 is not changed in the period between the time T4 and the time T7. Therefore, in the embodiment, in order to minimize noise according to the switching operation that occurs during sensing operation of the capacitance, the sensing pulse SMP may be applied in the period between the time T4 and the time T7 as described above, and the capacitance of the charge accumulated between the common electrode COM and the individual electrodes LA to LD by the sensing pulse SMP may be sensed.

In the embodiment, the sensing pulse SMP and the offset pulse SMP' are supplied during a part of the period from the time T4 to the time T7.

To this end, in the embodiment, the fourth upper-arm switching element Sd of the second driver 1310 is turned on at a time T4' so that the sensing pulse SMP is supplied to the individual electrodes LA to LD. At this time, the low-level control signal CMHM may be supplied to the S'a switching element at the time T4'. In addition, a high-level control signal LALP may be supplied to the Sd switching element at the time T4', and accordingly, the offset pulse SMP' having a first level LV1 may be supplied to the individual electrodes LA to LD. The offset pulse SMP' may be supplied from the time T4' to a time T5'. Thereafter, the supply of the offset pulse SMP' may be stopped, and the sensing pulse SMP may be supplied to the common electrode COM.

To this end, the fourth upper-arm switching element Sd is turned off before turning on the third upper-arm switching element Sc, and when the supply of the offset pulse SMP' is stopped by turning off the fourth upper-arm switching element Sd, the third upper-arm switching element Sc is turned on so that the sensing pulse SMP is supplied.

In addition, a low-level control signal CMLP may be supplied to the third upper-arm switching element Sc at the time T7, which is a predetermined time before T7 at which the first cycle ends.

Therefore, the sensing pulse SMP may be supplied to the common electrode COM during a period between a time T5 and a time T6.

Meanwhile, the switching element SWL of the sensor unit 962 may be turned on during the period between the time T5 and the time T6 at which the second driver 1310 operates. In addition, the charge accumulated by the sensing pulse SMP is provided to the sensor unit 962 by turning on the switching element SWL, and accordingly, the sensing operation of the capacitance may be performed.

At this time, in order to accurately sense the capacitance by the sensing pulse SMP, the period in which the sensing pulse SMP is supplied and the period in which the offset pulse SMP' is supplied are not overlapped with each other.

FIG. 21 is still another view referred to for describing an operation of a sensor unit.

FIG. 21 is similar to the operation description of FIG. 20, but in a period in which a sensing pulse SMPa and an offset pulse SMPa' are supplied, there is a difference in that the control signals CMLP and LALP for the operation of the third upper-arm switching element Sc and the fourth upper-arm switching element Sd have a plurality of pulses instead of a single pulse. That is, in FIG. 20, one sensing pulse SMP and one offset pulse SMP' are generated within the corresponding period, but in FIG. 21, a plurality of sensing pulses SMPa and a plurality of offset pulses SMPa' may be applied within the corresponding period.

That is, as shown in FIG. 21, the plurality of offset pulses SMPa' are applied to the individual electrodes LA to LD during a period from a time T4' to a time T5'. In addition, the plurality of sensing pulses SMPa are applied to the common electrode COM during a period from a time T5 to a time T6 that are not overlapped with the time T5'.

Accordingly, the sensor unit 962 may sense a capacitance corresponding to a size or change of the area of the boundary region Ac0 between the insulating layer on the individual electrode in the liquid lens 28 and the first liquid 122 during a period Dt1 between the time T5 and the time T6.

Specifically, during the period from the time T5 and the time T6, a plurality of pulse signals are applied to the common electrode COM, and accordingly a charge may be accumulated between the common electrode COM and the individual electrode LA. In addition, the accumulated charges may be moved to the sensor unit 962 by turning on the switching element SWL. Further, the sensor unit 962 may measure a capacitance corresponding to the moving charge to sense the curvature of the interface 130 corresponding thereto.

In addition, the plurality of sensing pulses SMPa are offset by the plurality of offset pulses SMPa' supplied to the individual electrodes LA to LD so as to correspond thereto, and accordingly, the interface of the liquid lens 28 is not affected.

FIG. 22 is one example of an internal block diagram of a camera module according to still another embodiment of the present invention.

Referring to the drawing, a lens curvature variation apparatus of FIG. 22 is similar to the camera module and lens curvature variation apparatus of FIG. 8, but there is a difference in that a sensor unit 962 senses capacitances of ends of a plurality of interfaces 130 corresponding to a plurality of individual electrodes LA to LD (134a to 134d), respectively.

To this end, a sensing pulse SMP is applied to the common electrode COM 132, and based on this, a capacitance accumulated by the applied sensing pulse SMP may be sensed at the plurality of individual electrodes LA to LD (134a to 134d).

Meanwhile, for an operation of the sensor unit 962, it is preferable that a plurality of switching elements SWLa to SWLd are included between conductive lines CA to CD that are connected between the plurality of individual electrodes LA to LD (134a to 134d) and the liquid lens 28 and the sensor unit 962.

The sensor unit 962 may sense the capacitance of the boundary region between the insulating layer on the plurality of individual electrodes LA to LD (134a to 134d) and the first liquid 122 during a period in which the plurality of switching elements SWLa to SWLd are turned on, based on the sensing pulse SMP applied to the common electrode COM, and may transmit it to the control unit 970.

Accordingly, it is possible to sense the capacitance of a plurality of boundary regions of the liquid lens 28.

Meanwhile, the sensor unit 962 is connected to the plurality of switching elements SWLa to SWLd, respectively, and accordingly, is configured in plural so as to sense the capacitance corresponding to each of the plurality of individual electrodes LA to LD.

Further, the AD converter 967 in FIG. 17 is configured in plural in order to convert analog signals related to capacitances sensed by the plurality of sensor units 962 into digital signals. In other words, in FIG. 17, the plurality of AD converters 967 and the plurality of sensor units 962 are connected on a one-to-one basis, and accordingly, an analog signal related to the capacitance corresponding to each of the individual electrodes LA to LD was sensed and converted into a digital signal.

Meanwhile, recently, a number of the individual electrodes LA to LD tends to increase to 4 or more, and it may be implemented to 8 or more. In such a case, a number of the lens driver 960 and the AD converter 967 are increased so as to correspond to the number of individual electrodes LA to LD, and accordingly, there is a problem that the product cost increases as the entire volume of the camera module increases.

Accordingly, in the embodiment, the analog signal related to the capacitance sensed at the plurality of sensor units 962 may be converted into the digital signal by using one AD converter 967.

To this end, the camera module may include a multiplexer (MUX) 968 and a capacitance holding unit 969.

An input terminal of the MUX 968 is connected to each of the plurality of sensor units 962. In addition, an output terminal of the MUX 968 is connected to one AD converter 967. In addition, the MUX 968 supplies one of the analog signals provided via the plurality of sensor units 962 according to a control signal of the control unit 970 to the AD converter 967.

For example, the sensor unit 962 may include a first sensor unit connected to the first individual electrode, a second sensor unit connected to the second individual electrode, a third sensor unit connected to the third individual electrode, and a fourth sensor unit connected to the fourth individual electrode. In addition, the MUX 968 may select an analog signal sensed at the first sensor unit according to a control signal of the control unit 970, and may transmit it to the AD converter 967. After the analog signal of the first sensor unit is transmitted to the AD converter 967, the MUX 968 may select an analog signal sensed at the second sensor unit according to the control signal of the control unit 970, and may transmit it to the AD converter 967. In addition, after the analog signal of the second sensor unit is transmitted to the AD converter 967, the MUX 968 may select an analog signal sensed at the third sensor unit according to the control signal of the control unit 970, and may transmit it to the AD converter 967. After the analog signal of the third sensor unit is transmitted to the AD converter 967, the MUX 968 may select an analog signal sensed at the fourth sensor unit according to the control signal of the control unit 970, and may transmit it to the AD converter 967. That is, the MUX 968 may sequentially select the analog signals sensed by the first to fourth sensor units, and may sequentially provide the analog signals to the AD converter 967. Accordingly, the analog signal sensed at each of the plurality of sensor units 962 may be processed by only one AD converter 967, thereby reducing the product cost and reducing the product volume.

Meanwhile, when the MUX 968 selects and outputs any one of the plurality of analog signals sensed by the plurality of sensor units 962, it is possible to wait until digital conversion of the output analog signals is completed. At this time, an analog signal not selected by the MUX 968 may change during a waiting time. For example, the sensed signal of the sensor unit 962 not selected by the MUX 968 may be reduced. Accordingly, the capacitance holding unit 969 is disposed between the MUX 968 and the plurality of sensor units 962. The capacitance holding unit 969 may store analog signals sensed by the plurality of sensor units 962, and may supply the analog signals to the MUX 968. Accordingly, it is possible to accurately sense the capacitance sensed at the plurality of sensor units 962 by using only one AD converter 967.

FIG. 23 is a flowchart for describing a control method of a liquid lens according to an embodiment step by step.

As described above, the control method of the liquid lens may include a step in which the individual electrodes LA to LD of the liquid lens are connected to the ground, and the sensing pulse SMP is applied to the common electrode COM of the liquid lens so that a charge is accumulated between the common electrode and the individual electrodes (S100), a step in which the switching element SWL disposed between the sensor unit 962 and the liquid lens 28 is turned on (ON), and a step of measuring a voltage across a reference capacitor of the sensor unit 962 (S110). Thereafter, the capacitance between the common electrode and the individual electrodes may be calculated by using the measured value of the voltage across the reference capacitor.

The liquid lens described above may be included in the camera module. The camera module may include a lens assembly including a liquid lens mounted in a housing and at least one solid lens that may be disposed in front of or behind the liquid lens, an image sensor that converts an optical signal transmitted via the lens assembly into an electrical signal. and a control circuit for supplying a driving voltage to the liquid lens.

FIG. 24 shows an example of a circuit constituting a first power supply unit according to an embodiment.

Referring to FIG. 24, an input power Vin is supplied to a first power supply unit 990*a*. In addition, the first power supply unit 990*a* may boost a strength of a voltage of the input power Vin to provide it to a lens driver 961. To this end, the first power supply unit 990*a* may be a high voltage regulator or a boost converter that boosts a voltage strength of the input power to a voltage strength required at the lens driver 961.

The first power supply unit 990*a* may include an inductor L1, a switching element S1, a diode D1, a comparator, a first resistor R1, a second resistor R2, a capacitor C1, and a control unit.

The first power supply unit 990*a* is a boost converter that boosts the input power Vin, and accordingly, a voltage strength of the input power Vin may be boosted to convert it into a voltage of the second level LV2.

To this end, the first power supply unit 990*a* may receive VDDA power via an input terminal. The input terminal is an input terminal of a voltage regulator, and a power supply of 1.8V to 3.6V may be input thereto. That is, the VDDA may refer to a terminal to which power of an analog circuit part is input.

The control unit may adjust a duty rate of the switching element S1 so that an output voltage VDDH is generated by the first power supply unit 990*a*. In this case, the output voltage VDDH may be a voltage of the second level LV2, and may be an input voltage of the lens driver 961. For example, the output voltage VDDH may be 70V.

The inductor L1, the diode D1, the switching element S1, and the control unit constituting the first power supply unit 990*a* are general boost converters, and detailed descriptions thereof will be omitted.

In addition, the capacitor C1 may be disposed at an output terminal of the first power supply unit 990*a*. The capacitor C1 may store an output voltage of the first power supply unit 990*a*, and accordingly, a stable second level voltage may be output by the first power supply unit 990*a*.

The first resistor R1, the second resistor R2, and the comparator are feedback circuits. That is, the first resistor R1 and the second resistor R2 may be connected to the output terminal of the first power supply unit 990*a*, and may divide the output voltage of the first power supply unit 990*a*. The first resistor R1 and the second resistor R2 divide the output voltage of the first power supply unit 990*a* with a preset voltage dividing ratio and output the divided voltage, and accordingly, it may be a voltage dividing resistor that enables sensing of the output voltage.

The comparator may receive a signal divided by the first resistor R1 and the second resistor R2 via a first terminal, and may receive a reference signal via a second terminal. In addition, the comparator may output a difference signal corresponding to a difference value between signals of the first terminal and the second terminal.

The difference signal output by the comparator is input to the control unit. The control unit may adjust a duty of a pulse width signal input to the switching element S1 based on the difference signal provided from the comparator so as to maintain the output voltage of the first power supply unit 990*a* constant.

Meanwhile, as described above, the first power supply unit 990*a* may be connected to a VSSA ground and a VSSH ground. The VSSA ground refers to a ground terminal of an analog circuit. That is, the analog circuit among circuits constituting the lens curvature variation apparatus in the embodiment may be commonly grounded to the VSSA ground. The VSSH ground may refer to a ground terminal of a digital circuit. That is, the digital circuit among the circuits constituting the lens curvature variation apparatus in the embodiment may be grounded commonly to the VSSH ground.

Meanwhile, the embodiment includes the sensor unit 962 for sensing the curvature of the liquid lens 28 formed based on the electrical signal and the AD converter 967 for converting the analog signal related to the capacitance sensed at the sensor unit 962 into the digital signal.

In addition, the sensor unit 962 and the AD converter 967 are also connected to any one of the VSSA ground and the VSSH ground.

Here, the first power supply unit 990a supplies a constant voltage to the lens driver 961 by a switching operation of the switching element S1. Therefore, the first power supply unit 990a includes a feedback circuit, and performs a switching operation based on a feedback signal of the feedback circuit so as to maintain a constant output voltage.

At this time, as described above, a ground terminal of the switching element S1 of the first power supply unit 990a may be commonly connected to ground terminals of the sensor unit 962 and the AD converter 967. In addition, when the switching operation of the switching element S1 of the first power supply unit 990a is performed, noise may occur at the ground terminal of the switching element S1, and the generated noise may affect a sensing operation of the sensor unit 962 and the AD converter 967. In other words, the noise may act as sensing noise that affects the operational reliability of the sensor unit 962 or the AD converter 967.

Therefore, in the embodiment, the first power supply unit 990a is activated or deactivated according to the operation of the sensor unit 962 or the AD converter 967. For example, the first power supply unit 990a may be deactivated during a sensing time at which the sensor unit 962 senses the interface of the liquid lens.

Specifically, in the embodiment, the operation of the first power supply unit 990a is prevented from being performed in a period in which the sensor unit 962 or the AD converter 967 operates. Preferably, the switching operation of the switching element S1 of the first power supply unit 990a is prevented from being performed in a period in which the sensor unit 962 or the AD converter 967 operates (hereinafter, referred to as "sensing time"). Preventing the switching operation from being performed may refer that a switching state of the switching element of the first power supply unit 990a is not changed. For example, when the switching state of the switching element S1 is in an on-state before the sensing time comes, the switching state of the switching element S1 may be maintained in the on-state until the sensing time ends. When the switching state of the switching element S1 is in an off-state before the sensing time comes, the switching state of the switching element S1 may be maintained in the off-state until the sensing time ends. Meanwhile, when the switching element S1 is maintained continuously in the on-state during the sensing time, an overcurrent may occur according to the on-state of the switching element S1, and circuit damage may occur due to the overcurrent. Therefore, in the embodiment, the switching element S1 is maintained in the off-state during the sensing time.

That is, in the embodiment, the switching element S1 is in the off-state before the sensing time comes, and accordingly, the switching element S1 is maintained in the off-state until the sensing time ends.

Meanwhile, no voltage is applied to the common electrode COM or the individual electrodes LA to LD at the sensing time, and accordingly, the switching element S1 of the first power supply unit 990a may operate in the off-state before the sensing time comes. Therefore, in the embodiment, the switching element S1 of the first power supply unit 990a may be maintained in the off-state during the sensing time.

In conclusion, deactivating the operation of the first power supply unit 990a in the embodiment may refer that the switching element S1 of the first power supply unit 990a is not switched, and it may refer that the switching element S1 of the first power supply unit 990a is maintained in the off-state. In addition, deactivating the operation of the first power supply unit 990a may refer that a feedback operation of the first power supply unit 990a is not performed, and accordingly, it may also refer that the pulse width control signal is not supplied to the switching element S1 via the control unit.

FIG. 25A is a view referred to for describing an operation of a first power supply unit according to a first embodiment.

Prior to the description of FIG. 25A, the parts already described in FIGS. 13A and 13B will be omitted.

Referring to FIG. 25A, a voltage SLP having a pulse width of Dt2 and a second level greater than the first level may be applied to the common electrode COM at the time T1.

Then, a voltage having a pulse width of Dt3 may be applied to the first individual electrode LA at the time T2.

At this time, a curvature formed at the interface 130 in the liquid lens 28 may be variable by a time difference DFF1 between a voltage applied to the common electrode COM and a voltage applied to the first individual electrode LA.

For example, as the time difference DFF1 of the voltage is smaller, the size of the area of the boundary region Ac0 between the electrode and the first liquid 122 may be increased, and accordingly, the capacitance may be increased, and consequently, the curvature may be decreased.

Meanwhile, the period in which the sensing pulse SMP is supplied may be set in a period in which a voltage is not applied to the common electrode COM and the individual electrodes LA to LD. At this time, voltages having different time differences may be applied to the plurality of individual electrodes LA to LD with reference to the voltage applied to the common electrode COM.

Accordingly, in the embodiment, a voltage having the largest time difference as compared with the voltage applied to the common electrode COM, among the voltages applied to the individual electrodes LA to LD, is set as a reference. For example, when the voltage applied to the first individual electrode LA among the plurality of individual electrodes LA to LD has a greatest time difference as compared with the voltage applied to the common electrode COM, a period between the time at which the voltage is not supplied to the first individual electrode LA and the time at which the first cycle ends is determined as the period in which the sensing pulse SMP is supplied.

In addition, the maximum value of the driving voltage that may be supplied to the liquid lens 28 is decreased during the period in which the sensing pulse SMP is supplied. That is, the driving voltage of the liquid lens 28 increases as the time difference between the voltage applied to the common electrode COM and the voltage applied to the individual electrodes LA to LD increases. At this time, the voltage is not supplied to the individual electrodes LA to LD during the period in which the sensing pulse SMP is supplied, and as a result, the voltage supplied to the individual electrodes LA to LD may not be delayed as compared with the voltage supplied to the common electrode COM during the period in which the sensing pulse SMP is supplied. Therefore, when the period in which the sensing pulse SMP is supplied is too large, the maximum value of the driving voltage that may be supplied to the liquid lens 28 is decreased, and when the period in which the sensing pulse SMP is supplied is too small, the sensing operation of the capacitance may not be performed normally. Accordingly, in the embodiment, an optimal supply period of the sensing pulse SMP that may solve the above problems is set.

For the reasons described above, the sensing pulse SMP is separated from the end time of the first cycle by a predetermined time, and is generated in a period as close as possible to the end time of the first cycle. At this time, the period in which the sensing pulse SMP is generated is set to be 1% or more as compared with the period of the first cycle. That is, when the period in which the sensing pulse SMP is generated is less than 1% of the entire period of the first cycle, a charge amount accumulated by the sensing pulse SMP is small, and thus accurate sensing of the capacitance may not be performed. In addition, that is, when the period in which the sensing pulse SMP is generated is less than 1% of the entire period of the first cycle, sufficient time required to sense the capacitance at the sensor unit 962 is not secured, and thus accurate sensing of the capacitance may not be performed. At this time, the period in which the sensing pulse SMP is generated is set to be 10% or less compared to the entire period of the first cycle. That is, when the period in which the sensing pulse SMP is generated exceeds 10% of the entire period of the first cycle, the maximum driving voltage that may be supplied to the liquid lens 28 decreases, and accordingly, the interface of the liquid lens 28 may not be formed to have a desired curvature. Preferably, the period in which the sensing pulse SMP is generated is set to have a range between 3% and 6% of the entire period of the first cycle. More preferably, the period in which the sensing pulse SMP is generated is set to be 5% of the entire period of the first cycle.

Meanwhile, an activation signal BE of the first power supply unit 990a may be provided in a remaining period excluding the sensing time. In addition, the first power supply unit 990a may be controlled to an activated state and a deactivated state by the activation signal (Booster Enable). In addition, the control unit controls the activation signal so that the operation of the first power supply unit 990a is deactivated during the sensing time.

Here, the sensing time may be defined from a time at which the sensing pulse SMP is applied to a time at which digital data corresponding to the sensed capacitance is output via the AD converter 967.

Therefore, the activation signal BE may have an on-level before the time (a time T5) at which the sensing pulse SMP is supplied. That is, the first power supply unit 990a is activated so that the switching operation of the switching element S1 according to the feedback signal may be performed from the time T1 to the time T5 before the sensing pulse SMP is supplied. In addition, the activation signal BE may have an off-level from the time T5 at which the sensing pulse SMP is supplied. That is, the first power supply unit 990a may be deactivated until the time T5 at which the sensing pulse SMP is supplied to stop the switching operation of the switching element S1.

In addition, the off-level of the activation signal BE may be maintained until a time at which the operation of the sensor unit 962 and the operation of the AD converter 967 are all completed. At this time, the AD converter 967 may be composed of one piece, and unlike this, may be composed of four pieces. In addition, an end time of the sensing time ST may be changed according to a number of the AD converters 967. For example, the sensing time ST may start at the time T5 and end before a time T7. Alternatively, the sensing time ST may start at the time T5 and end at a time T7', which is after the time T7. That is, the end of the sensing time ST may be ended at a time at which digital data corresponding to each of the capacitances of the four individual electrodes are all output via the AD converter 967.

In addition, the control unit 970 in the embodiment may output the signal BE that deactivates the operation of the first power supply unit 990a at the sensing time ST.

FIG. 25B is a view referred to for describing an operation of a first power supply unit according to a second embodiment.

In FIG. 25A, the on-level of the activation signal BE was maintained before the time T5, and was changed to the off-level at the time T5.

However, alternatively, the activation signal BE may be changed to the off-level before the time T5 for the operation reliability.

That is, when a time at which the activation signal BE is changed from the on-level to the off-level is the time T5, the switching operation of the switching element S1 of the first power supply unit 990a may be performed simultaneously with the start of the time T5. In addition, noise according to the switching operation of the switching element S1 may occur at the time T5, which may affect the magnitude of the sensing pulse SMP.

Therefore, according to FIG. 25B, the activation signal BE may be changed to the off-level at a time point T5', which is a predetermined time before the time T5 is started, and accordingly, the off-level may be maintained during a sensing time ST'.

Meanwhile, when the first power supply unit 990a is in the deactivated state, the output voltage of the first power supply unit 990a may be reduced according to a load state. That is, when the first power supply unit 990a is in the activated state, the capacitor C1 may be charged with the voltage. In addition, when the first power supply unit 990a is in the deactivated state, the output voltage is maintained only by the discharge of the capacitor C1. That is, when the first power supply unit 990a is in the deactivated state, the output voltage of the first power supply unit 990a may decrease due to the load and a leakage current because the feedback operation is not performed. At this time, the deactivation of the first power supply unit 990a is performed when there is no switching operation of the lens driver 961 (when the switching element of the lens driver is in the off-state). Accordingly, an amount of decrease in the output voltage due to the load becomes zero, and decreases only due to the leakage current, which is performed in a range that does not affect the driving of the common electrode or the individual electrode. Therefore, in the embodiment, even though the operation of the first power supply unit 990a is deactivated, the driving of the common electrode or the individual electrode is not affected.

Hereinafter, the sensing times ST and ST' will be described in more detail.

The sensing times ST and ST' may be largely divided into a first time, a second time, and a third time.

The first time may refer to a period in which the sensing pulse SMP is supplied. In other words, the first time may refer to a time from when the second driver 1310 generating the sensing pulse SMP is turned on to when it is turned off. For example, the first time may refer to the time T5 to a time T6.

In addition, the second time may refer to a time required from a time at which a signal corresponding to the sensing pulse SMP is supplied to the sensor unit 962 by the supply of the sensing pulse SMP to a time at which the signal is converted into an analog signal capable of expressing capacitance information. In other words, the second time may refer to a time from a time at which the sensing pulse SMP is received to a time at which the analog signal corresponding to the capacitance information is output.

In addition, the third time may refer to a time from a time at which the analog signal is input via the AD converter 967 to a time at which digital data corresponding to the analog signal is output. In addition, when the AD converter 967 is commonly used as shown in FIG. 22, the third time may refer to a time from a time at which an analog signal corresponding to the first individual electrode is input to a time at which digital data corresponding to the last individual electrode is output.

FIG. 26 is a view for describing an operation of the AD converter according to an embodiment.

Referring to (a) and (b) of FIG. 26, an analog signal obtained via the sensor unit 962 is input to the AD converter 967. Then, the AD converter 967 converts the analog signal into digital data to output.

That is, an analog signal including voltage information corresponding to a capacitance which is an output signal of the sensor unit 962 is input to an input terminal of the AD converter 967.

Then, a clock signal is input to a clock terminal of the AD converter 967.

Then, the AD converter 967 converts the analog signal input via the input terminal into digital data to be output according to the clock signal input via the clock terminal.

That is, the AD converter 967 converts the analog signal into digital data from an Nth bit to a first bit to be output according to the clock signal.

At this time, when noise occurs during the operation of the AD converter 967, a change may occur in the analog signal, which causes an error in an output value of the digital data. Therefore, in the embodiment, the operation of the first power supply unit 990*a* may be deactivated until a time at which the digital data is output via the AD converter 967 so as to minimize noise generation according to switching of the switching element S1 of the first power supply unit 990*a*.

FIGS. 27A and 27B are examples of waveform diagrams for describing an operation of a lens driver according to an embodiment.

Prior to the description thereof, according to FIG. 13A, a first cycle of the waveform diagram refers from a time T1 to a time T7, and accordingly, a new first cycle starts at the time T7, and a voltage SLP having a second level may be applied to the common electrode COM.

At this time, the switching state of the first driver 961 may be changed at the time T7. For example, the first driver 961 may include a plurality of switching elements, and at least one of them may be changed from an off-state to an on-state at the time T7. In addition, when the operation of the AD converter 967 is performed at a time at which the switching of the first driver 961 is performed, an error of digital data converted via the AD converter 967 may occur.

Therefore, in the embodiment, the switching operation of the first driver 961 is also not performed during the sensing time.

According to FIG. 27A, the sensing time ST may be divided into a first sensing period ST1 and a second sensing period ST2. In addition, the first sensing period ST1 may be a period including the first time and the second time described above. In addition, the second sensing period ST2 may be a period including the third time. In other words, the first sensing period ST1 may refer to a period from a time at which the sensing pulse SMP is generated to a time at which an analog signal is output via the sensor unit 962. In addition, the second sensing period ST2 may refer to a period from a time at which the analog signal is input to the AD converter 967 to a time at which digital data is output from the AD converter 967.

Accordingly, in the embodiment, the sensing time may be divided into a plurality of periods so that the sensing time is not overlapped with the switching period of the first driver 961.

That is, in the embodiment, the first sensing period may be started at the time T5 in FIG. 25A or the time T5' in FIG. 25B. Then, the first sensing period may end before the time T7. In other words, the first sensing period may start at the time T5 or the time T5' and end before the time T7.

At this time, the output of the analog signal in a normal operation is completed before the time T7. In addition, when the sensing period is not divided, the operation of the AD converter 967 may be started before the time T7. At this time, when the operation of the AD converter 967 starts before the time T7 and ends before the time T7, there is no problem in the reliability of digital data output via the AD converter 967. However, depending on an embodiment, the operation of the AD converter 967 may end after the time T7. Therefore, in the first embodiment, the start of the operation of the AD converter 967 may be performed after the time T7.

That is, when the first sensing period ends before the time T7, the operation of the AD converter 967 is stopped until the time T7 comes, and accordingly, after the time T7 comes (i.e., after the switching of the first driver 961 is performed), the operation of the AD converter 967 may be started. Accordingly, it is possible to improve the accuracy of digital data output from the AD converter 967 without affecting the operation of the first driver 961.

In addition, according to FIG. 27B, in the second embodiment, the switching of the first driver 961 may not be performed during the sensing time.

That is, unlike FIG. 27A, in FIG. 27B, the first sensing period ST1 and the second sensing period ST2 may be connected to perform the operation without distinction. That is, the operation of the AD converter 967 may be immediately started at a time at which an analog signal is output from the sensor unit 962.

At this time, when the operation of the AD converter 967 is not completed before the time T7, the operation of the first driver 961 is not performed until the operation of the AD converter 967 is completed. In other words, when the end of the AD converter 967 is made at a time T7' rather than the time T7, the first driver 961 does not perform the switching operation at the time T7, and the switching operation is performed at the time T7' delayed by a delay time DL. Accordingly, rather than a pulse width of Dt2, a voltage having a pulse width reduced by DL from the Dt2 may be applied to the common electrode COM. However, the delay time DL is performed within a range that does not significantly affect the driving voltage of the common electrode COM, and accordingly, it may not affect the curvature formed by the interface of the liquid lens.

As described above, in the embodiment, when recognizing a movement and shape of the interface through the change of the capacitance of the interface of the liquid lens, the sensing noise generated due to the switching operation of the power supply unit may be reduced by turning off (the operation of the power supply unit is deactivated) the switch of the power supply unit, and accordingly, the accuracy of sensing the capacitance may be improved.

In addition, in the embodiment, the sensing noise generated due to the switching operation of the lens driver may be reduced by preventing the switching operation of the lens driver from being changed at a data lead time of an analog-digital converter of the sensing time recognizing the movement and shape of the interface through the change of the capacitance of the interface of the liquid lens, and accordingly, the accuracy of the capacitance may be improved.

FIG. 28 is a view showing an external appearance of a video display device according to one embodiment of the present invention, and FIG. 29 is a view showing an optical unit and a display of the video display device of FIG. 28 separately.

Referring to the drawings, a video display device 1400 may include a display 1480.

The display 1480 may display an input image, and an optical unit 1495 may be spaced apart from the display 1480 at a predetermined distance, and may be disposed in a user direction. FIG. 16B illustrates separating the distance between the display 1480 and the optical unit 1495.

The optical unit 1495 may be configured to be able to change a traveling direction of light according to the applied power.

For example, the optical unit 1495 may include the liquid lens control circuit including the liquid lens described in FIG. 8 to FIG. 27.

Accordingly, the traveling direction of the light output from the video display device 1400 may be changed by the varied curvature of the lens, thereby improving visibility when watching a video.

Meanwhile, a method of operating the lens curvature variable device of the present invention may be implemented as a processor-readable code in a recording medium readable by the processor included in the lens curvature variable device. The processor-readable recording medium includes all types of recording devices in which data readable by the processor is stored. Examples of the processor-readable recording medium include a ROM, a RAM, a CD-ROM, a magnetic tape, a floppy disk, an optical data storage system, and the like, and include what is implemented in the form of carrier waves such as transmission through the Internet. Further, the processor-readable recording medium may be distributed to computer systems connected via a network, and the processor-readable code may be stored and executed in a distributed manner.

In addition, preferred embodiments of the present invention are shown and described above, but the present invention is not limited to the specific embodiments described above, of course, various modifications may be made by those skilled in the art to which the invention belongs without departing from the gist of the present invention claimed in the claims, and such modifications should not be individually understood from the technological scope or the prospect of the present invention.

What is claimed is:

1. A lens curvature variation apparatus comprising:
a liquid lens including a first electrode and a second electrode, and containing a first liquid and a second liquid forming an interface with each other;
a voltage booster including a first switching element, the voltage booster being configured to convert an input voltage into a voltage of a first level higher than the input voltage by a switching operation of the first switching element;
a lens driver configured to apply a driving pulse of the first level for adjusting the interface to the first electrode and the second electrode by using the voltage of the first level and to apply a sensing pulse of a second level lower than the first level for sensing the interface to the first electrode and the second electrode;
a sensor unit configured to sense the interface based on the sensing pulse applied from the lens driver; and
a control unit configured to control the lens driver so that the liquid lens forms a target interface based on information of the interface sensed by the sensor unit,
wherein the driving pulse of the first level includes a first driving pulse of the first level applied to the first electrode and a second driving pulse of the first level applied to the second electrode with a time difference from the first driving pulse,
wherein the sensing pulse includes a first sensing pulse of the second level provided to the first electrode and a second sensing pulse of the second level provided to the second electrode,
wherein the first sensing pulse and the second sensing pulse are applied at a time when the first driving pulse and the second driving pulse are not applied,
wherein times at which the first and second sensing pulses are provided do not overlap with each other,
wherein the voltage booster is deactivated during a sensing time at which the interface of the liquid lens is sensed by the sensor unit,
wherein the sensing time is greater than a time between a point in time when the second sensing pulse is supplied and a time when the supply of the second sensing pulse is stopped, and
wherein the sensing time starts after the first switching element is turned off and ends before the first switching element is turned on.

2. The lens curvature variation apparatus of claim 1, wherein the voltage booster is controlled by an activation signal (Booster Enable) into an activated state and a deactivated state, and
the activation signal is controlled so that an operation of the voltage booster is deactivated during the sensing time.

3. The lens curvature variation apparatus of claim 1, wherein a state of the first switching element maintains an off-state to deactivate an operation of the voltage booster during the sensing time.

4. The lens curvature variation apparatus of claim 1, wherein the lens driver includes:
a driving voltage driver configured to supply the first and second driving pulses of the first level higher than the second level to the first electrode and the second electrode; and
a sensing voltage driver configured to supply the first and second sensing pulses of the second level lower than the first level to the first electrode and the second electrode.

5. The lens curvature variation apparatus of claim 4, further comprising a sensing voltage supply unit configured to convert the input voltage into a voltage of the second level to supply the voltage of the second level to the sensing voltage driver.

6. The lens curvature variation apparatus of claim 4, further comprising:
an analog-digital (AD) converter configured to convert an analog signal output by the sensor unit into digital data,
wherein the sensor unit is configured to:
sense a capacitance corresponding to a position of the interface of the liquid lens; and
output an analog signal corresponding to the sensed capacitance to the AD converter.

7. The lens curvature variation apparatus of claim 6, wherein the sensing time is from a time at which the second sensing pulse is supplied to a time at which the conversion into the digital data is completed.

8. The lens curvature variation apparatus of claim 6, wherein the deactivation of the voltage booster is maintained until a time when the digital data is output through the AD converter.

9. The lens curvature variation apparatus of claim 6, wherein the sensing time includes a first sensing period and a second sensing period, and
wherein the voltage booster is deactivated in the first sensing period and the second sensing period.

10. The lens curvature variation apparatus of claim 9, wherein the first sensing period is a period from a time at which the second sensing pulse is generated to a time at which the analog signal is output through the sensor unit, and
wherein the second sensing period is a period from a time at which the analog signal is input to the AD converter to a time at which digital data is output from the AD converter.

11. The lens curvature variation apparatus of claim 2, wherein the lens driver includes:
a driving voltage driver configured to supply the first and second driving pulses of the first level higher than the second level to the first electrode and the second electrode; and
a sensing voltage driver configured to supply the first and second sensing pulses of the second level lower than the first level to the first electrode and the second electrode.

12. The lens curvature variation apparatus of claim 3, wherein the lens driver includes:
a driving voltage driver configured to supply the first and second driving pulses of the first level higher than the second level to the first electrode and the second electrode; and
a sensing voltage driver configured to supply the first and second sensing pulses of the second level lower than the first level to the first electrode and the second electrode.

* * * * *